United States Patent
Shah et al.

(10) Patent No.: US 8,826,020 B2
(45) Date of Patent: Sep. 2, 2014

(54) HOME NODE-B APPARATUS AND SECURITY PROTOCOLS

(71) Applicant: InterDigital Patent Holdings, Inc., Wilmington, DE (US)

(72) Inventors: Yogendra C. Shah, Exton, PA (US); Inhyok Cha, Gangnam-Ku (KR); Andreas U. Schmidt, Frankfurt am Main (DE)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

(21) Appl. No.: 13/658,908

(22) Filed: Oct. 24, 2012

(65) Prior Publication Data

US 2013/0046980 A1  Feb. 21, 2013

Related U.S. Application Data

(63) Continuation of application No. 12/563,392, filed on Sep. 21, 2009, now Pat. No. 8,307,205.

(60) Provisional application No. 61/099,828, filed on Sep. 24, 2008, provisional application No. 61/106,050, filed on Oct. 16, 2008, provisional application No. 61/110,092, filed on Oct. 31, 2008, provisional application No. 61/110,255, filed on Oct. 31, 2008.

(51) Int. Cl.
*H04L 29/06* (2006.01)

(52) U.S. Cl.
USPC .......................................................... 713/168

(58) Field of Classification Search
USPC .......................................................... 713/168
See application file for complete search history.

(56) References Cited

U.S. PATENT DOCUMENTS

| | | | |
|---|---|---|---|
| 8,307,205 | B2 | 11/2012 | Cha et al. |
| 2006/0018470 | A1 | 1/2006 | Paila |
| 2006/0112267 | A1 | 5/2006 | Zimmer et al. |
| 2007/0042754 | A1 | 2/2007 | Bajikar et al. |
| 2007/0097904 | A1 | 5/2007 | Mukherjee |
| 2007/0266256 | A1 | 11/2007 | Shah et al. |
| 2008/0182592 | A1* | 7/2008 | Cha et al. .................. 455/456.3 |
| 2008/0207137 | A1 | 8/2008 | Maharajh |
| 2008/0267114 | A1 | 10/2008 | Mukherjee et al. |
| 2008/0267153 | A1* | 10/2008 | Mukherjee et al. .......... 370/338 |
| 2009/0239533 | A1* | 9/2009 | Somasundaram et al. .... 455/434 |
| 2009/0265543 | A1* | 10/2009 | Khetawat et al. ............. 713/151 |

FOREIGN PATENT DOCUMENTS

| | | |
|---|---|---|
| CN | 101136826 | 3/2008 |
| CN | 101500233 | 8/2009 |
| WO | WO 2006/047425 | 5/2006 |
| WO | WO 2009/041780 | 4/2009 |

OTHER PUBLICATIONS

China Mobile et al., "Solution for User-Based UP Ciphering", 3GPP TSG-SA3 Meeting #50,Sanya China, S3-080151, Feb. 25-29, 2008, 6 pages.

(Continued)

*Primary Examiner* — Michael S McNally
(74) *Attorney, Agent, or Firm* — Baker & Hostetler LLP

(57) ABSTRACT

A method for authenticating a home nodeB/home evolved node B (H(e)NB) with a network is disclosed. The method includes securely storing H(e)NB location information in a Trusted Environment (TrE); and securely sending the stored H(e)NB location information to the network via the TrE

22 Claims, 15 Drawing Sheets

(56) References Cited

OTHER PUBLICATIONS

Ericsson et al., "LTE Home NB Text Proposal", 3GPP TSG RAN WG3 Meeting #55bis, St. Julians's, Malta, R3-070714, Mar. 27-30, 2007, 5 pages.

Huawei Technologies Co., Ltd. "H(e)NB: Contribution to Section 7.7 Comparison Security of H(e)NB Location Certification Methods", 3GPP TSG SA WG3 Security, S3#ad hoc, S3-080969, Sophia-Antipolis, France, Sep. 23-26, 2008, 5 pages.

Huawei, "Editorial Changes to H(e)NB TR", 3GPP TSG SA WG3 Security—S3#ad hoc, S3-080966, Sophia-Anitpolis, France, Sep. 23-26, 2008, 14 pages.

Interdigital et al., "pCR on TR 33.820 to add a New Section 7.2.2 for H(e)NB Trusted Environment", 3GPP TSG SA WG3 Security #53, Kyoto, Japan, S3-081261, Nov. 10-14, 2008, 3 pages.

Interdigital, "pCR on TR 33.820 for a New Section on H(e)NB TrE interfaces", 3GPP TSG SA WG3 Security #53, S3-081268, Kyoto, Japan, Nov. 10-14, 2008, 3 pages.

Kaufman, "Internet Key Exchange (IKEv2) Protocol", Network Working Group, RFC 4306, Dec. 2005, 100 pages.

Orange, "Home eNB Attachment Scenario", 3GPP TSG-RAN WG3 #59, R3-080514, Sorrento, Feb. 11-15, 2008, 3 pages.

Qualcomm, Interdigital, "Table of Comparison of H(e)NB Authentication Methods", 3GPP TSG SA WG3 Security, SA3ad-hoc, Sophia Antipolis, Sep. 23-26, 2008, 8 pages.

RAN3, "LS on Security Aspects for Home eNB," 3GPP TSG RAN WG3 Meeting #59, R3-080538, Sorrento, Italy, Feb. 11-15, 2008, 2 pages.

Third Generation Partnership Project,(3GPP) TR 33.820 V1.0.0,"3$^{rd}$ Generation Partnership Project; Technical Specification Group Service and System Aspects; Security of H(e)NB" (Release 8), Sep. 2008, 37 pages.

Third Generation Partnership Project,(3GPP) TR 33.820 V1.1.0,"3$^{rd}$ Generation Partnership Project; Technical Specification Group Service and System Aspects; Security of H(e)NB" (Release 8), Sep. 2008, 42 pages.

Third Generation Partnership Project,(3GPP) TR 33.820 V8.1.0,"3$^{rd}$ Generation Partnership Project; Technical Specification Group Service and System Aspects; Security of H(e)NB" (Release 8), Jun. 2009, 78 pages.

Trusted Computing Group, "TCG Trusted Network Connect TNC Architecture for Interoperability", Specification Version 1.0, Revision 4, May 3, 2005, 39 pages.

\* cited by examiner

HOME NODE-B APPARATUS AND SECURITY PROTOCOLS

CROSS REFERENCE TO RELATED APPLICATIONS

This application is a continuation of U.S. Ser. No. 12/563,392 filed on Sep. 21, 2009. This application claims the benefit of U.S. provisional application Nos. 61/099,828 filed on Sep. 24, 2008, 61/106,050 filed Oct. 16, 2008, 61/110,092 filed Oct. 31, 2008 and 61/110,255 filed Oct. 31, 2008, which are incorporated by reference as if fully set forth.

TECHNICAL FIELD

This application is related to wireless communications.

BACKGROUND

A goal of the Third Generation Partnership Project (3GPP) Long Term Evolution (LTE) program is to develop new technology, new architecture and new methods for LTE settings and configurations in order to provide improved spectral efficiency, reduced latency, and better utilization of radio resources for faster user experiences and richer applications and services with less cost. As part of these efforts, the 3GPP has introduced the concept of a home, evolved node B (H(e)NB) for LTE networks. 3GPP is also considering a home NB (HNB) for wideband code division multiple access (WCDMA). The acronym H(e)NB is used in this application hereinafter to refer to both a H(e)NB and a HNB.

The H(e)NB gives users access to LTE services (it may also provide WCDMA, Global System for Mobile Communication (GSM) Edge Radio Access Network (GERAN), and other cellular services) over extremely small service areas such as homes and small offices. The user, whether an individual or an organization, will be able to deploy a H(e)NB in an area where such service is desired. A framework for an authentication protocol between the H(e)NB and a Security Gateway (SGW) for the mandatory authentication of the H(e)NB and the optional authentication of a hosting party has also been introduced. The protocol provides a basic framework for device and hosting party authentication and all other later, encrypted communications (under IPsec) between the H(e)NB and the SGW and other core network entities such as a home location register (HLR) and authentication authorization accounting (AAA) server.

Certain internet key exchange v2 (IKEv2) parameters such as MULTIPLE_AUTH_SUPPORTED and CERTREQ have also been introduced as an indicator of the capabilities of the SGW in terms of supporting various possibilities (out of which one should be chosen or negotiated with the HeNB) in the context of H(e)NB authentication. The use of these parameters, however, results in many "ambiguous" situations in terms of the final selection of which type of authentication may be selected.

A number of security threats have also been identified in the above protocol and more generally to the devices and equipment that perform the protocols. The threats considered include but are not limited to: compromise of H(e)NB authentication token by a brute force attack via a weak authentication algorithm; compromise of H(e)NB authentication token by local physical intrusion; inserting a valid authentication token into a manipulated H(e)NB; user cloning the H(e)NB authentication token; man-in-the-middle attacks on H(e)NB first network access; booting H(e)NB with fraudulent software ("re-flashing"); fraudulent software update/configuration changes; physical tampering with H(e)NB; eavesdropping of the other user's universal terrestrial radio access network (UTRAN) or evolved UTRAN (E-UTRAN) user data; masquerading as other users; changing of the H(e)NB location without reporting; software simulation of H(e)NB; traffic tunneling between H(e)NBs; misconfiguration of the firewall in the modem/router; denial of service attacks against H(e)NB; denial of service attacks against core network; compromise of an H(e)NB by exploiting weaknesses of active network services; user's network ID revealed to H(e)NB owner; mis-configuration of H(e)NB; mis-configuration of access control list (ACL) or compromise of the ACL; radio resource management tampering; masquerade as a valid H(e)NB; provide radio access service over a closed subscriber group (CSG); H(e)NB announcing incorrect location to the network; manipulation of external time source; and environmental/side channel attacks against H(e)NB.

It has been also proposed to use location information for authentication of the H(e)NB. An H(e)NB could be located by using one or any combination of the following three types of location information: fixed access line location (e.g. IP address of the H(e)NB's backhaul port); information on macro cells, including macro 3G and 2G cells; and global positioning system (GPS) in the H(e)NB.

Steps for location registration (or certification) and later steps for location-based authentication have also been introduced. These methods, however, suffer from several deficiencies, including the fact that the information about the location being obtained at the H(e)NB may be insecurely handled within the device before being sent to the network.

The deployment of H(e)NBs in LTE and other wireless communication systems introduces security issues that need to be addressed for a successful implementation. As such there exists a need for authentication protocols for a H(e)NB with a trusted environment and an optional hosting party module (HPM) that in some embodiments could be implemented on a UICC.

SUMMARY

Home Node B and/or Home evolved Node B (H(e)NB) apparatus and security/authentication protocols are disclosed. The H(e)NB includes a trusted environment (TrE), and security/authentication protocols for communication between the H(e)NB and external network elements, including a Security Gateway (SGW). Also disclosed are interfaces used between the TrE and the H(e)NB including unprotected interfaces, cryptographically protected interfaces, and hardware protected interfaces. Authentication methods are disclosed including signaling conventions between the SGW and H(e)NB.

In general, the SGW indicates to the H(e)NB whether the H(e)NB is required to perform hosting party authentication in addition to device authentication. The SGW also indicates to the H(e)NB whether the H(e)NB is required to perform certificate-based authentication or extensible authentication protocol-authentication key agreement (EAP-AKA)-based authentication. In an embodiment, the SGW indicates the type of authentication in IKE_SA_INIT response using MULTIPLE_AUTH_SUPPORTED parameter, the H(e)NB indicates a type of authentication in IKE_AUTH request with MULTIPLE_AUTH_SUPPORTED and ANOTHER_AUTH_FOLLOWS parameters and the SGW indicates a type of device authentication with a CERTREQ parameter in IKE_SA_INIT response. In another embodiment, the H(e)NB indicates to the SGW, using the IKEv2 protocol, the result of the device integrity check performed by the TrE in combination with sending information for device authentication, thereby achieving device validation and device authentication using a common protocol.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Disclosed herein is a system and architecture for deploying a home evolved node b and home node b (collectively H(e)NB) for wireless communications and a description of authentication signaling between the H(e)NB and a secure gateway (SGW) and the authentication methods that may be used to establish wireless communications.

Figure 1:
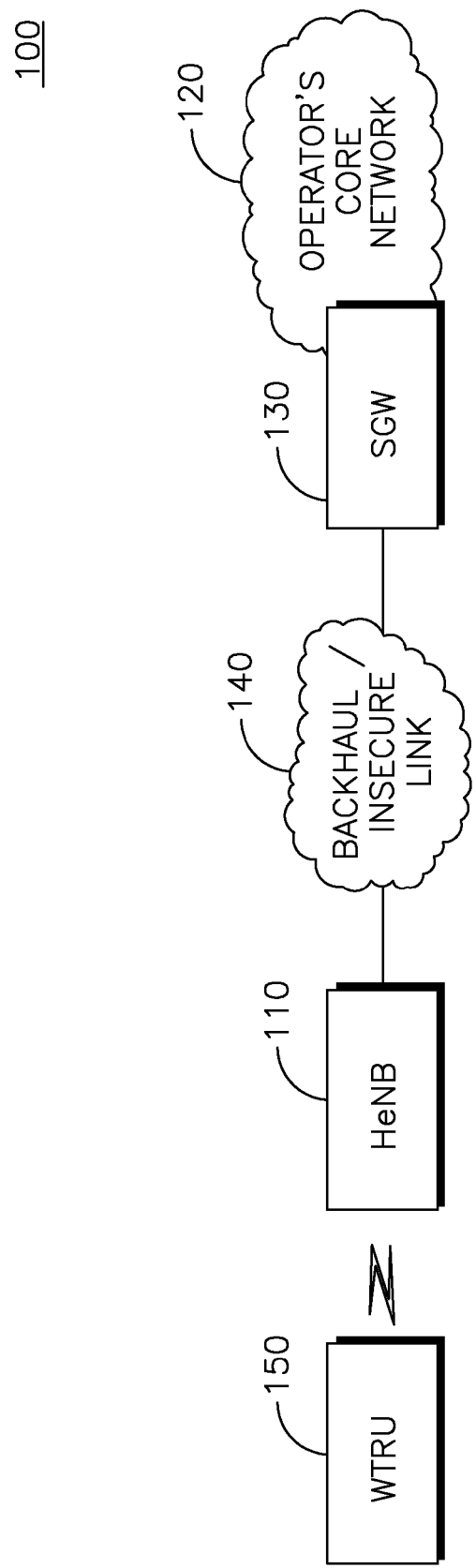
FIG. 1 is an example system architecture.

FIG. 1 is an example security system architecture 100 for deployment of a H(e)NB 110. H(e)NB 110 accesses an operator's core network 120 via a SGW 130. SGW 130 represents an operator's core network 120 in performing mutual authentication with H(e)NB 110. Mutual authentication may need support of an authentication server or a public key infrastructure (PKI). The backhaul 140 between H(e)NB 110 and SGW 130 may be insecure, and a security tunnel may be established between H(e)NB 110 and SGW 130 to protect information transmitted in backhaul link 140. H(e)N 110 communicates with a WTRU 150 over an air interface.

Figure 2:
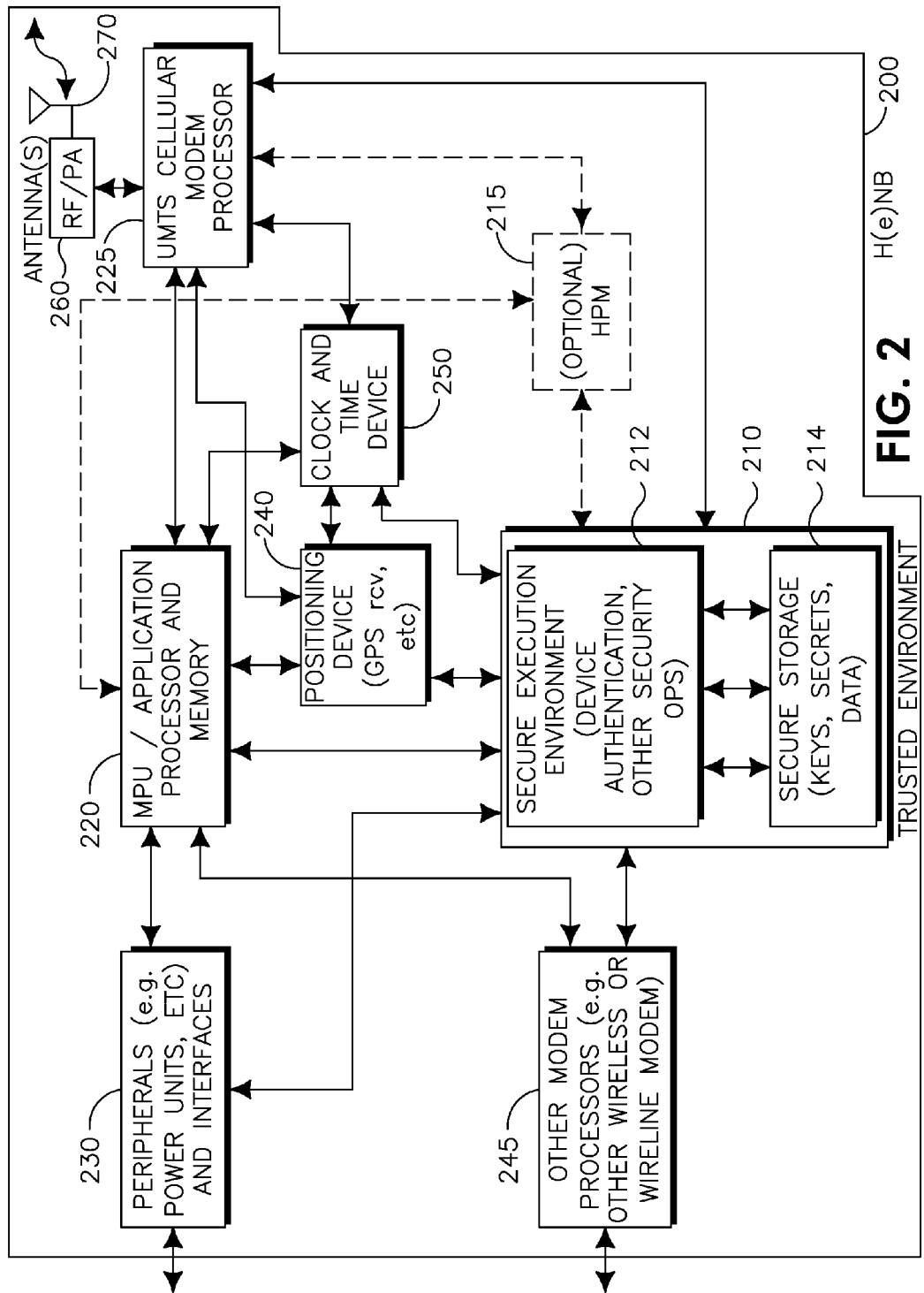
FIG. 2 is an example functional block diagram of Home evolved Node B (H(e)NB)

FIG. 2 shows a functional block diagram of an example embodiment of a H(e)NB 200. H(e)NB 200 includes a Trusted Environment (TrE) 210 and may be optionally connected to, or in communication with (collectively "connected to"), a hosting party module (HPM) 215. For example, the HPM 215 could be embodied by a universal integrated circuit card (UICC).

TrE 210 further includes a secure execution environment 212 and a secure storage area 214. TrE 210 is further connected to a main processing unit (MPU)/application processor 220, one or more universal mobile telecommunications system (UMTS) cellular modem processor(s) 225, peripherals 230 including power units and local interfaces, a positioning device 240, one or more non-UMTS cellular, or non-cellular, modem processors(s) 245 and a clock and time device 250. The components listed herein are illustrative, and H(e)NB 200 may include all or some of the components as well as other components.

MPU 220 is further connected to UMTS cellular modem processor(s) 225, peripherals 230, positioning device 240, non-UMTS cellular or non-cellular modem processors(s) 245 and clock and time device 250. MPU 220 may also be connected to HPM 215. Positioning device 240 is further connected to clock and time device 250 and UMTS cellular modem processor(s) 225. UMTS cellular modem processor(s) 225 is also connected to a power amplifier (PA)/radio frequency (RF) module 260, which is in turn is connected to antenna unit(s) 270. HPM 215 may also be connected to UMTS cellular modem processor(s) 225. As disclosed, a HPM 215 may also be included in the H(e)NB 200. When the HPM 215 is included, the HPM 215 provides authentication and key agreement (AKA)-based authentication services for the hosting party, an entity that hosts an H(e)NB 200 on his/her premises. The HPM 215 may perform hosting party authentication on behalf of the UMTS mobile network operator.

TrE 210 is physically and logically bound to H(e)NB 200, acts as a trusted entity within H(e)NB 200 and provides an anchor for the H(e)NB 200. Secure storage area 214 provides a secure storage area for keys, secrets, and other sensitive data and programs. Secure execution environment 212 provides an environment to perform AKA and certificate-based authentication of H(e)NB 200 to a UMTS network, and authentication of the SGW and via it the UMTS network. The secure execution environment 212 allows TrE 210 to perform a number of tasks as disclosed herein.

For example, TrE 210 performs other security-sensitive operations such as encryption and decryption of data and traffic across UMTS and other interfaces, and execution of security-sensitive programs and data manipulation, both on behalf of, and independently from, MPU 220. TrE 210 may also perform all tasks related to securely indicating, to the network via the SGW, the validity of itself or any other component or its operation of H(e)NB 200.

TrE 210 may also perform validation operations where TrE 210 checks the validity (authenticity and/or integrity) of itself and the rest of H(e)NB 200, including the hardware and software (including programs and data) of MPU 220, HPM 215 when included, cellular and non-cellular modem(s) 225 and 245, and other peripherals 230 and interfaces. When TrE 210 detects an invalid component or sub-entity through its validity check, it performs a secure, ordered set of lock-down (of itself and the rest of the H(e)NB) 200 and/or reporting (to the network, before lock-down) operations.

TrE 210 may further protect programs and data including certificates, and validating the location/positioning device(s) and the clock and timing devices, both of which are mandated before H(e)NB 200 can be authorized by the network or before H(e)NB 200 is cleared to establish an operational connectivity to the network. It may also perform any security-sensitive device management and over-the-air (OTA) tasks for security-sensitive data or programs. It may protect, monitor, and execute security policies or security controls for H(e)NB 200 and/or its individual components/sub-entities, or itself It may also set up and maintain (including tearing-down) a secure channel between it and any other component within H(e)NB 200 and/or a network entity e.g., HPM, SGW, authentication center (AuC) or home location register (HLR), etc. It may further store, protect, extract, update, and securely provide (to other components within H(e)NB 200) any data that needs to be passed to such other component, for internal security operations or for external communication, including back-haul communication (including those for device and/or hosting-party authentication) with the SGW.

As is evident from FIG. 2, TrE 210 needs to interact with several H(e)NB 200 functional building blocks to securely perform the desired functions, such as authentication. To establish the necessary connections, TrE 210 should have access to various interfaces to such functions and resources within H(e)NB 200. These interfaces of TrE 210 are generally functions of TrE 210, they are initialized in the secure start-up process of TrE 210, and they are thus assumed to operate correctly. Under these premises, TrE 210 can be analyzed with regard to their security properties, to establish a secure and efficient design of H(e)NB 200.

In an embodiment, there are three broad security categories of TrE interfaces including unprotected interfaces, cryptographically protected interfaces (secure channels) and hardware protected interfaces.

Unprotected interfaces facilitate communication between TrE 210 and general resources of H(e)NB 200 which are not assumed to be secured against tampering and/or eavesdropping. It should be noted that unprotected interfaces can nevertheless give access to data which is cryptographically protected by TrE 210, for instance when TrE 210 is in possession of the pertinent key material and stores the latter in secured memory.

Cryptographically protected interfaces (secure channels) are protected by security protocols which provide encrypted communication. Moreover, they can establish a secure channel which additionally provides authentication of the entity with which TrE 210 communicates and additional desired features such as message authentication.

Hardware protected interfaces provide physical protection against attacks, for instance measures against side-channel attacks.

H(e)NB 200 embodiments consider various aspects that are relevant for the choice of a particular TrE interface configuration. Unprotected interfaces may be chosen when the communicating entity does not provide protection of the communicated data. An example can be ephemeral secrets used in communication protocols. Cryptographically protected interfaces may be chosen when the resource with which TrE 210 communicates needs clear text access to the conveyed information and when it can provide some protection thereof. Hardware protected interfaces will generally connect TrE 210 to hardware secured resources, to maintain the protection level of the overall system.

Figure 3:
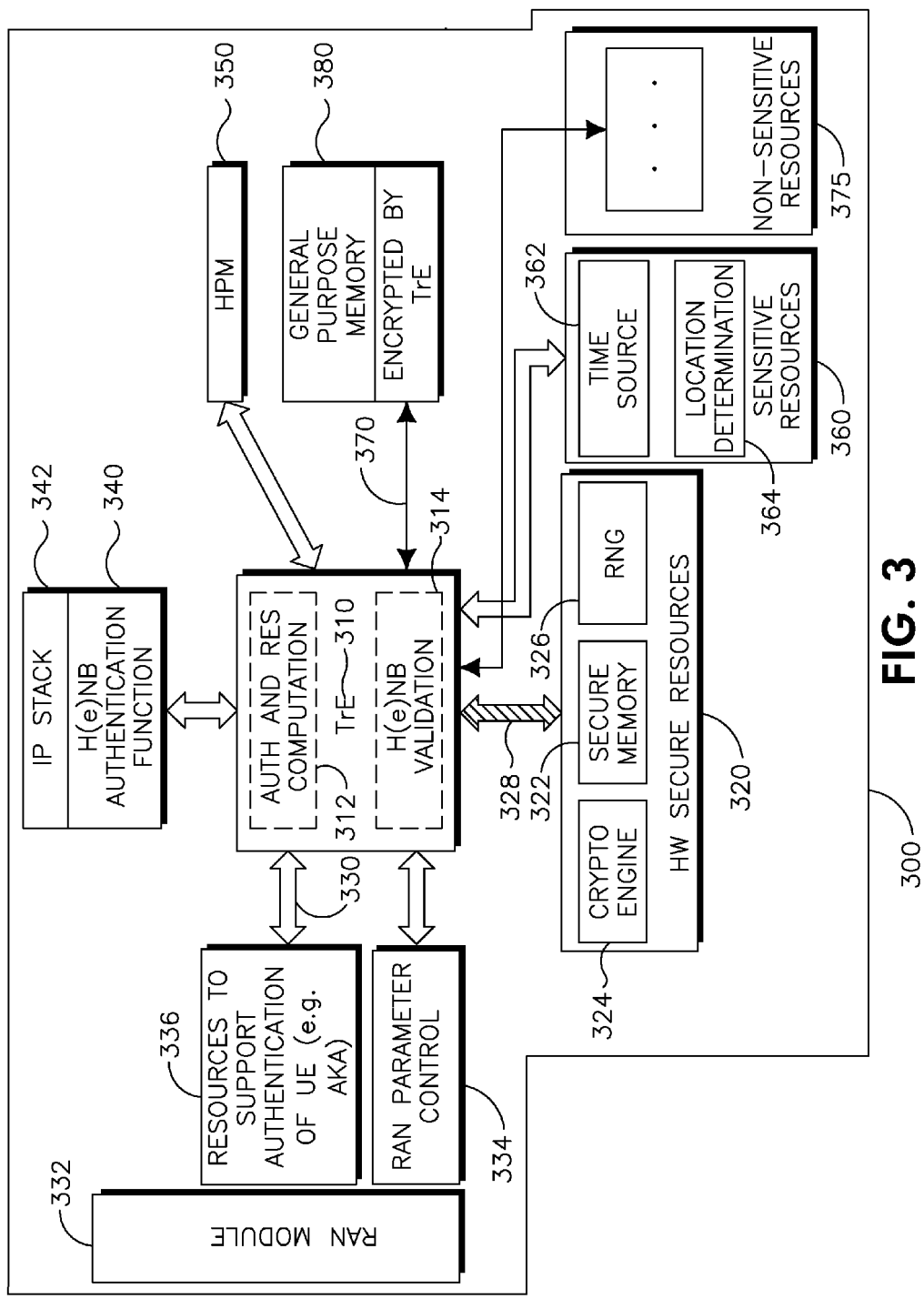
FIG. 3 is an example interface configuration of a Trusted Environment (TrE) in a H(e)NB.

FIG. 3 shows an embodiment of an interface configuration of a TrE 310 in an H(e)NB 300. In this example, TrE 310 is in a thin configuration, meaning that it has relatively limited functionality within itself, including the capability to compute Extensible Authentication Protocol Method for UMTS Authentication and Key Agreement (EAP-AKA) result (RES) and authentication part (AUTH) parameters using AUTH and RES module 312 for device authentication and performs validation using a validation function 314 for H(e)NB 300. TrE 310 then interfaces with other functions or resources residing on H(e)NB 300. Some of the interfaces are hardware protected, some are protected by cryptographic encryption, and others are unprotected. It is assumed that those resources and functions outside of TrE 310 that interface with TrE 310 via hardware protected interface or cryptographically protected interfaces should be protected resources and functions themselves. If such resources and functions are not protected, there is little reason for TrE 310 to interface with them on protected interfaces.

TrE 310 builds upon special hardware protected resources 320 which are only accessible by TrE 310, such as a secure memory 322, cryptographic function engine 324, and a (physical when desired) random number generator 326, when needed. These special hardware protected resources could be called the Root of Trust (RoT) of the TrE 310. These resources must be accessed via hardware protected interfaces 328 to establish trustworthiness of TrE 310 itself, and in particular to enable the secure start-up process of TrE 310 and H(e)NB 300. Other functional building blocks of H(e)NB 300 may have varied security properties and may be accessed via secure channels 330. For example, random generator module 332, random parameter control 334, WTRU authentication resources 336, H(e)NB authentication 340, IP stack 342, and host platform module 350 are accessed via cryptographic protected interface or secure channel 330. Sensitive information 360 such as for example, time source 362 and location determination 364 are accessed via cryptographic protected interface or secure channel 330 A combination with certain hardware protection measures is optional in such cases. Additionally, unprotected interfaces 370 connect to non-sensitive resources 375 and to general purpose resources, for instance to extend TrE's 410 memory with storage capacity 380. As described herein, interfaces may vary in security needs and the TrE needs to accommodate and interact with each interface type.

Figure 4:
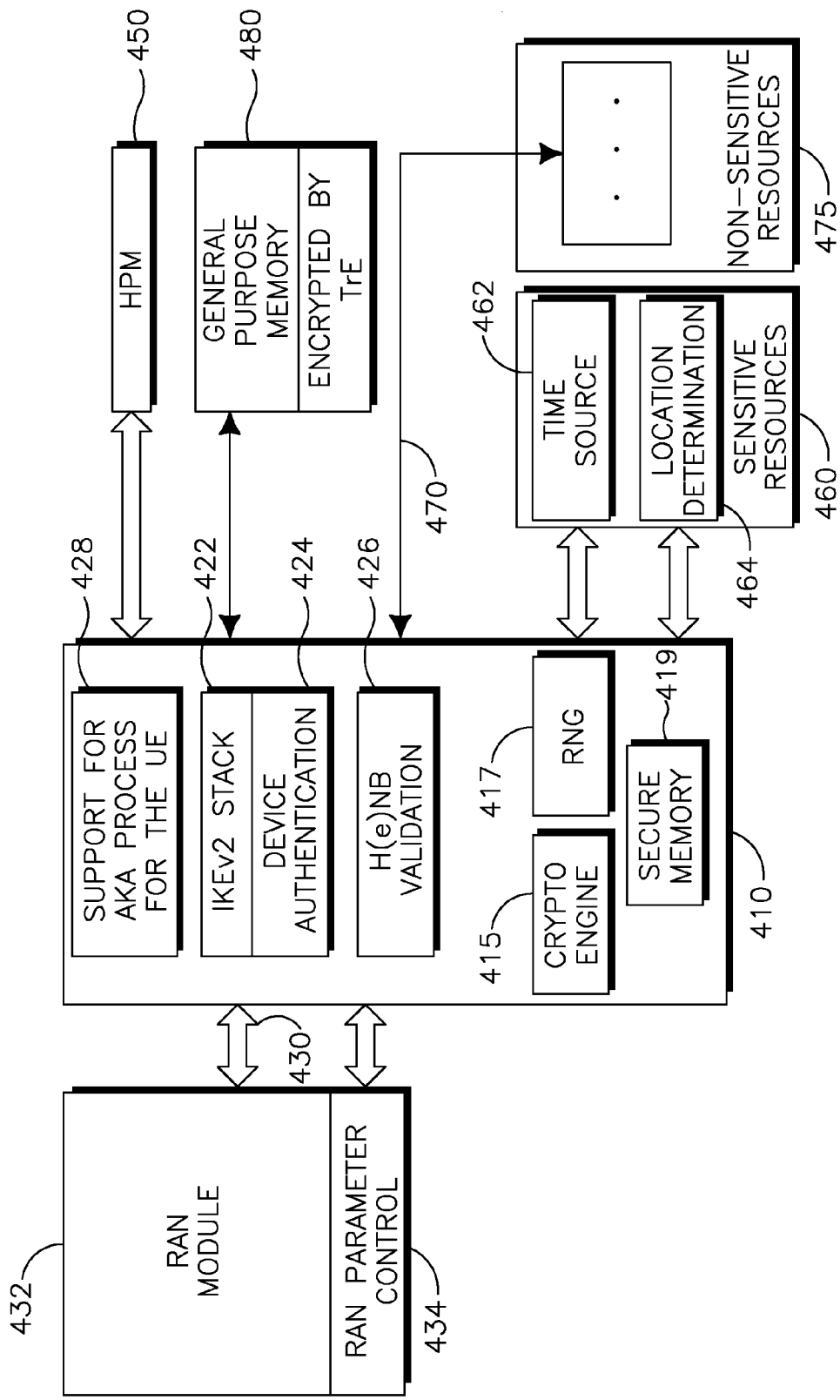
FIG. 4 is another example interface configuration of a Trusted Environment (TrE) in a H(e)NB.

FIG. 4 shows another interface configuration for a H(e)NB 400 having a TrE 410. In this embodiment, TrE 410 is in a thicker configuration that includes within itself hardware cryptographic resources such as for example, cryptographic engine 415, random number generator 417, and secure memory 419. TrE 410 further includes the full capability to perform device authentication over Internet Key Exchange (IKEv2) using for example IKEv2 stack 422, device authentication 424 and H(e)NB validation module 426. TrE 410 also supports the WTRU's AKA procedure with module 428. It is noted that the IKEv2 protocol is used for illustrative purposes throughout the description and other protocols may also be used such as, but not limited to, Transport Layer Security (TLS), Broadband Forum Technical Requirements (TR) 069, Open Mobile Alliance (OMA) Device Management (DM) protocols, or some suitable Internet Engineering Task Force (IETF) Requests for Comments (RFCs) for extensions of the TLS.

In this embodiment, random generator module 432, random parameter control 434, host platform module 450, and sensitive information 460 such as for example, time source 462 and location determination 464 are also accessed via cryptographic protected interface or secure channel 430. Additionally, unprotected interfaces 470 connect to non-sensitive resources 475 and to general purpose resources, for instance to extend the TrE's storage capacity 480.

In another embodiment, there are two broad types of interfaces, one protected and the other unprotected. The interfaces that are depicted as either hardware-protected interfaces or cryptographically-protected interfaces in FIGS. 3 and 4, for example, could be simply considered as protected interfaces, and those interfaces that are depicted as unprotected interfaces could be simply considered as unprotected interfaces, respectively.

As stated herein, an authentication protocol between the H(e)NB and a SGW has been introduced for the mandatory authentication of the H(e)NB and the optional authentication of a hosting party. A method for authentication selection is now disclosed which uses the TrE capabilities discussed herein. Internet Key Exchange version 2 (IKEv2) may be used as a basic framework for secure communication (including those for authentication) between the H(e)NB and the core network. IKEv2 sets up a security association (SA) between the H(e)NB and the SGW, and makes avail security keys that can be used for setting up a IPSec tunnel between the two entities. IKEv2 may also be used for combined authentication of the H(e)NB and the hosting party.

IKEv2 is a component of IPsec that is used for performing mutual authentication and establishing and maintaining security associations (SAs). In the context of the H(e)NB, the 'end-point to security gateway tunnel' is readily applicable. Thus, between the H(e)NB as an end-point and the SGW, IKEv2 steps ensue that comprise of a first phase (IKE_SA_INIT) involving negotiation of security parameters for the IKE_SA and sending of random nonces and Diffie-Hellman values, and a second phase (IKE_AUTH) comprising request/response steps that include transmission of identities and setting up of an SA for the Authentication Header (AH) and/or Encapsulated Security Payload (ESP).

At least two different authentication actions are specified, one for authentication of the H(e)NB device itself (called Device Authentication) and the other for authentication of the hosting party (called Hosting-Party Authentication). Device Authentication is mandated. It could be done by using either extensible authentication protocol-authentication key agreement (EAP-AKA) or certificates. The Hosting-Party Authentication may be done using a Hosting-Party Module (HPM). When Hosting-Party authentication is done, it may be done separately from device authentication, or it may be done in a composite manner using the steps for device authentication and hosting party authentication. Further, the ID of the H(e)NB and the ID of the HPM could be physically or logically bounded and a possible protocol for such a binding has been introduced herein.

In general, disclosed first is an authentication protocol signaling scheme where SGW indicates to a H(e)NB whether the H(e)NB is required to perform hosting party authentication in addition to device authentication. The SGW also indicates to the H(e)NB whether the H(e)NB is required to perform certificate-based authentication or EAP-AKA based authentication. The SGW indicates the type of authentication in IKE_SA_INIT response using a MULTIPLE_AUTH_SUPPORTED parameter and indicates a type of device authentication with a CERTREQ parameter in IKE_SA INIT response. The H(e)NB indicates a type of authentication in IKE_AUTH request with MULTIPLE_AUTH_SUPPORTED and ANOTHER_AUTH_FOLLOWS parameters.

As discussed herein, when MULTIPLE_AUTH_SUPPORTED and CERTREQ parameters are sent in the various IKEv2 response messages from the SGW to the H(e)NB, they should be interpreted as a requirement or request to the H(e)NB. Notably, the SGW really 'determines' and then sends as a request or requirement to the H(e)NB which type of authentication method should be used. This results in clear, unambiguous outcomes for all possible combinations of the request and response pairs in the selection procedure. Note that implicitly, the same parameters should also be interpreted as indicators of the SGW's capabilities, since the indicated selection of the method would not be sent if it were not supported by SGW.

As stated herein, H(e)NB will have mandatory device authentication and optional hosting party (HP) authentication. These two authentications can be done in different ways and in practice the deployed products (H(e)NB and SGW) may support mandatory authentication or both optional and mandatory authentication. Thus, a method for selecting the type of authentication for a given H(e)NB connecting to the operator network (via the SGW) is required. Since the SGW enforces the operator policy, the selection made and indicated to the H(e)NB by the SGW is authoritative.

In one embodiment of the authentication selection method, the method assumes: 1) device authentication by certificate or EAP-AKA, and 2) hosting party authentication for EAP-AKA. The embodiment of the method presented assumes the use of IKEv2 multiple authentications.

As discussed hereinafter, mandatory device authentication and optional hosting party authentication is done in the H(e)NB. Authentication can either be done by a certificate based solution or EAP-AKA. This results in the following combinations with respect to the two authentication methods and the two entities that may need authentication: 1) device authentication with certificates and without HP authentication; 2) device authentication with EAP-AKA and without HP authentication; 3) device authentication with certificates and with HP authentication using certificates; 4) device authentication with EAP-AKA and with HP authentication using certificates; 5) device authentication with certificates and with HP authentication using EAP-AKA; and 6) device authentication with EAP-AKA and with HP authentication using EAP-AKA. If it is assumed for this embodiment that EAP-AKA may be the choice for HP authentication, then authentication combinations 3 and 4 may be dismissed.

Figure 5:
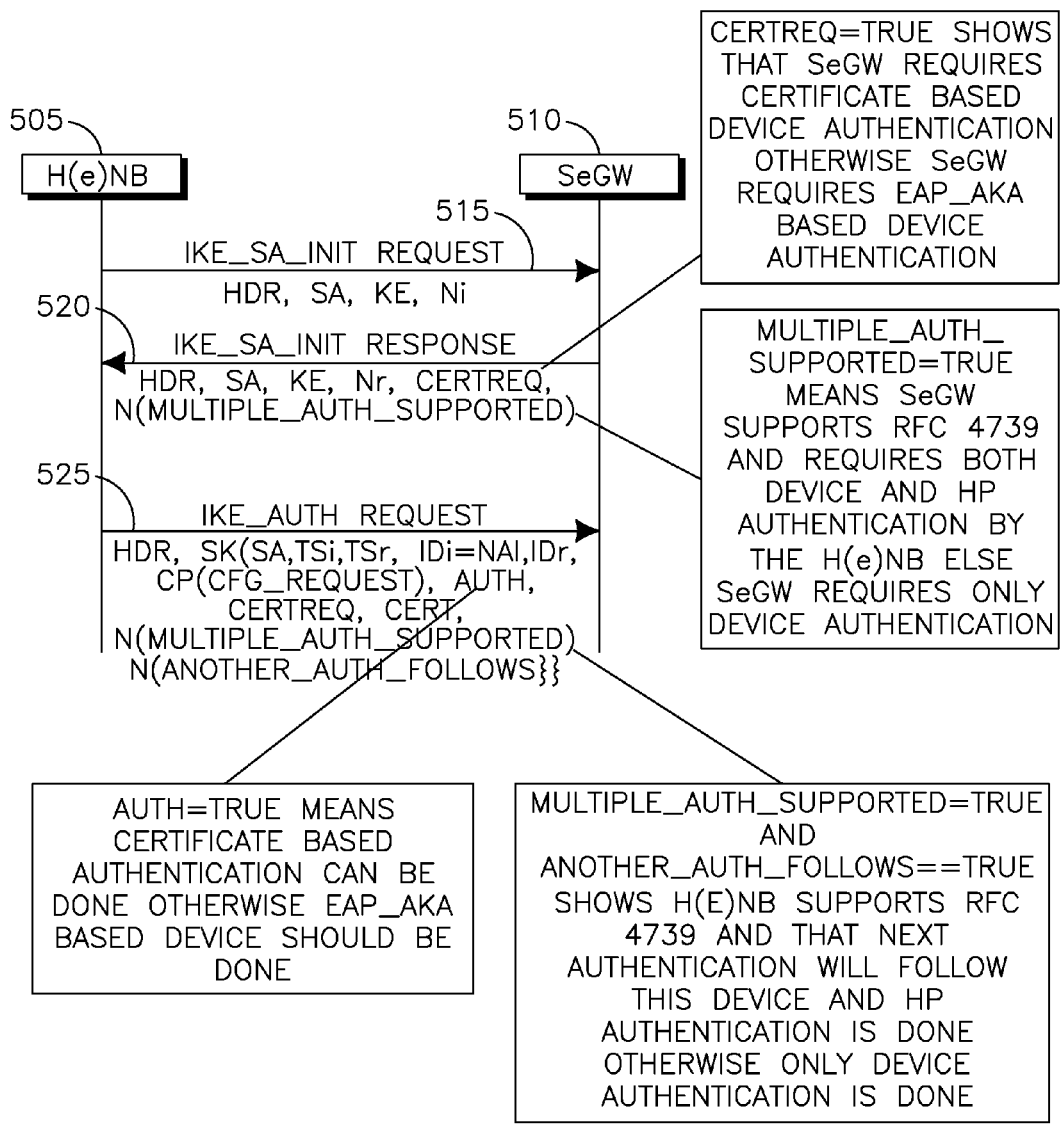
FIG. 5 is an example flowchart for determining authentication type.

Disclosed with reference to FIG. 5 is a method 500 between a H(e)NB 505 and a SGW 510 to determine whether there will be device authentication or both device and HP authentication. Method 500 is an IKEv2 based authentication procedure in accordance with one embodiment. Initially, H(e)NB 505 sends a IKE_SA_INIT request message to SGW 510 (515). SGW 510 sends an IKE_SA_INIT response message (520). If the IKE_SA_INIT response message does not include MULTIPLE_AUTH_SUPPORTED then it is clear to H(e)NB 505 that multiple authentications cannot be done. Thus only device authentication will be possible using certificate or EAP-AKA based authentication.

H(e)NB 505 sends a IKE_AUTH request message (525). SGW 510 determines whether the IKE_AUTH request message contains MULTIPLE_AUTH_SUPPORTED and ANOTHER_AUTH_FOLLOWS. If IKE_AUTH request message does not contain the given values then it means that only device authentication can be done. If the given values are there, then both device and HP authentication can be done.

Disclosed again with reference to FIG. 5 is a method to determine whether the type of device authentication is certificate based or EAP-AKA based. H(e)NB 505 determines the availability of CERTREQ in IKE_SA_NIT response (520). If there is CERTREQ in IKE_SA_INIT response to H(e)NB 505 then it implies that SGW 510 supports certificate based device authentication and it may also support EAP-AKA based authentication. If there is no CERTREQ in IKE_SA_INIT response from SGW 510 to H(e)NB 505, then it implies that SGW 510 supports EAP-AKA based authentication.

Certificate based device authentication may also be performed by the SGW 510 by determining if the IKE_AUTH request (525) from H(e)NB 505 to SGW 510 contains the AUTH. If there is AUTH, then it means that certificate based device authentication will be performed, otherwise it means that EAP-AKA based authentication will be performed. As noted herein, hosting party (HP) authentication uses EAP-AKA.

In an embodiment of the authentication selection method, the selection of the authentication mechanism uses the principles discussed herein. The H(e)NB should support device authentication using either certificate or EAP-AKA. The decision regarding which of the above two methods, (that is, certificate based device authentication method or EAP-AKA based device authentication method), will be selected in practice as a deployment-specific decision. The H(e)NB may support the combined authentication using certificate or EAP-AKA for device authentication and EAP-AKA for hosting party authentication. Even if the SGW supports both authentication mechanisms it may reject the use of one of them based on operator policy. The SGW unambiguously indicates to the H(e)NB whether it requires the H(e)NB to perform both device authentication and hosting-party authentication or just the device authentication, and also if it requires the H(e)NB to perform certificate based device authentication or EAP-AKA based device authentication.

Based on the criteria discussed above, the authentication selection method is discussed Tables 1-4 below. The contents of the table refer to the final result of the authentication method selection. Tables 1-4 summarize the authentication method selection in accordance with an embodiment. In the tables, M_A_S is MULTIPLE_AUTH_SUPPORTED; I_S_I is IKE_SA_INIT; A_A_F is ANOTHER_AUTH_FOLLOWS.

Table 1 represents the scenario where the H(e)NB returns AUTH, MULTIPLE_AUTH SUPPORTED and ANOTHER_AUTH FOLLOWS in the IKE_AUTH request message in response to four different SGW IKE_SA_INIT responses. In case 1, the SGW sends an IKE_SA_INIT response with MULTIPLE_AUTH_SUPPORTED and CERTREQ. The H(e)NB request message corresponds to performing certificate based device and EAP-AKA based hosting party authentication. In case 2, the SGW sends an IKE_SA_INIT response with MULTIPLE_AUTH_SUPPORTED with no CERTREQ. The H(e)NB request message corresponds to an error condition as the SGW required an EAP-AKA based device and EAP-AKA based hosting party authentication but the H(e)NB responds with a certification-based device authentication. If this happens, SGW's decision on the final outcome should depend on operator policy. In case 3, the SGW sends an IKE_SA_INIT response with only CERTREQ. The H(e)NB request message corresponds to an error condition as the SGW required only certification-based device authentication but H(e)NB responds with an attempt for both device and hosting party authentication. If this happens, SGW's final decision on outcome should depend on operator policy. In case 4, the SGW sends an IKE_SA_INIT with no MULTIPLE_AUTH_SUPPORTED or CERTREQ. The H(e)NB request message corresponds to an error condition as the SGW required H(e)NB to perform only EAP-AKA based device authentication but the H(e)NB responds to perform both device and hosting party authentication. If this happens, SGW's decision on outcome should depend on operator policy.

TABLE 1

|  |  | IKE_SA_INIT response | | | |
|---|---|---|---|---|---|
|  |  | SGW includes M_A_S and CERTREQ payload in the I_S_I response | SGW includes M_A_S but not CERTREQ payload in the I_S_I response | SGW does not include M_A_S but includes CERTREQ payload in the I_S_I response | SGW does not include M_A_S or CERTREQ payload in the I_S_I response |
| IKE_AUTH request message | H(e)NB includes AUTH, M_A_S & A_A_F notification payloads in the first IKE_AUTH request message | Case 1: Certificate based device and EAP-AKA based hosting party authentication done. | Case 2: This is an error condition. | Case 3: This is an error condition. | Case 4: This is an error condition. |

Table 2 represents the scenario where the H(e)NB returns MULTIPLE_AUTH SUPPORTED and ANOTHER_AUTH FOLLOWS but no AUTH in the IKE_AUTH request message in response to the four different SGW IKE_SA_INIT responses. In case 5, the SGW sends an IKE_SA_INIT response with MULTIPLE_AUTH_SUPPORTED and CERTREQ. The H(e)NB request message corresponds to an error condition as SGW message requires certificate-based device authentication but H(e)NB indicates, by skipping the AUTH, that it does not support certificate-based device authentication. If this happens, SGW's decision on outcome should depend on operator policy. In case 6, the SGW sends an IKE_SA_INIT response with MULTIPLE_AUTH_SUPPORTED with no CERTREQ. The H(e)NB request message corresponds to performing EAP-AKA based device and hosting party authentication. In case 7, the SGW sends an IKE_SA_INIT response with only CERTREQ. The H(e)NB request message corresponds to an error condition as the SGW requires the H(e)NB to perform only device authentication with certificate but the H(e)NB attempts to perform both device authentication AND hosting-party authentication. If this happens, SGW's final decision on outcome should depend on operator policy. In case 8, the SGW sends an IKE_SA_INIT with no MULTIPLE_AUTH_SUPPORTED or CERTREQ. The H(e)NB request message corresponds to an error condition as the SGW required H(e)NB to perform only device authentication based on EAP-AKA, but H(e)NB attempts to perform both device and hosting-party authentication. If this happens, SGW's decision on outcome should depend on operator policy.

TABLE 2

| | | IKE_SA_INIT response | | | |
|---|---|---|---|---|---|
| | | SGW includes M_A_S and CERTREQ payload in the I_S_I response | SGW includes M_A_S but not CERTREQ payload in the I_S_I response | SGW does not include M_A_S but includes CERTREQ payload in the I_S_I response | SGW does not include M_A_S or CERTREQ payload in the I_S_I response |
| IKE_AUTH request message | H(e)NB does not include AUTH but includes M_A_S & A_A_F payloads in the first IKE_AUTH request message | Case 5: This is an error condition. | Case 6: EAP-AKA based device and hosting party authentication is done. | Case 7: This is an error condition. | Case 8: This is an error condition. |

Table 3 represents the scenario where the H(e)NB returns AUTH but no MULTIPLE_AUTH_SUPPORTED and ANOTHER_AUTH FOLLOWS in the IKE_AUTH request message in response to the four different SGW IKE_SA_NIT responses. In case 9, the SGW sends an IKE_SA_INIT response with MULTIPLE_AUTH_SUPPORTED and CERTREQ. The H(e)NB request message corresponds to an error condition as the SGW requires certification based device authentication and a hosting-party authentication but H(e)NB attempts to perform just certificate-based device authentication. If this happens, SGW's decision on outcome should depend on operator policy. In case 10, the SGW sends an IKE_SA_NIT response with MULTIPLE_AUTH_SUPPORTED with no CERTREQ. The H(e)NB request message corresponds to an error condition as the SGW required the EAP-AKA based device and EAP-AKA based hosting party authentication but the H(e)NB attempts to perform just certificate-based device authentication. If this happens, SGW's decision on outcome should depend on operator policy. In case 11, the SGW sends an IKE_SA INIT response with only CERTREQ. The H(e)NB request message corresponds by performing certificate-based device authentication. In case 12, the SGW sends an IKE_SA INIT with no MULTIPLE_AUTH_SUPPORTED or CERTREQ. The H(e)NB request message corresponds to an error condition as the SGW required H(e)NB to perform device authentication based on EAP-AKA, but H(e)NB attempts to perform certificate-based device authentication. If this happens, SGW's decision on outcome should depend on operator policy.

TABLE 3

| | | IKE_SA_INIT response | | | |
|---|---|---|---|---|---|
| | | SGW includes M_A_S and CERTREQ payload in the I_S_I response | SGW includes M_A_S but not CERTREQ payload in the I_S_I response | SGW does not include M_A_S but includes CERTREQ payload in the I_S_I response | SGW does not include M_A_S or CERTREQ payload in the I_S_I response |
| IKE_AUTH request message | H(e)NB includes AUTH but not M_A_S & A_A_F notification payloads in the first IKE_AUTH request message | Case 9: This is an error condition: | Case 10: This is an error condition: | Case 11: Certificate-based device authentication. | Case 12: This is an error condition. |

Table 4 represents the scenario where the H(e)NB returns no AUTH, MULTIPLE_AUTH SUPPORTED and ANOTHER_AUTH FOLLOWS in the IKE_AUTH request message in response to the four different SGW IKE_SA_INIT responses. In case 13, the SGW sends an IKE_SA_INIT response with MULTIPLE_AUTH_SUPPORTED and CERTREQ. The H(e)NB request message corresponds to an error condition as the SGW required certificate-based device authentication and a hosting-party authentication but H(e)NB attempts to perform EAP-AKA based device authentication. If this happens, SGW's decision on outcome should depend on operator policy. In case 14, the SGW sends an IKE_SA_INIT response with MULTIPLE_AUTH_SUPPORTED with no CERTREQ. The H(e)NB request message corresponds to an error condition as the SGW required both EAP-AKA based device authentication and EAP-AKA based hosting party authentication but the H(e)NB attempts to perform only EAP-AKA based device authentication. If this happens, SGW's decision on outcome should depend on operator policy. In case 15, the SGW sends an IKE_SA_INIT response with only CERTREQ. The H(e)NB request message corresponds to an error condition as the SGW required the H(e)NB to perform certificate-based device authentication but the H(e)NB attempts to perform EAP-AKA based device authentication. If this happens, SGW's decision on outcome should depend on operator policy. In case 16, the SGW sends an IKE_SA_INIT with no MULTIPLE_AUTH_SUPPORTED or CERTREQ. The H(e)NB request message corresponds to performing EAP-AKA based device authentication.

TABLE 4

|  |  | IKE_SA_INIT response | | | |
|---|---|---|---|---|---|
|  |  | SGW includes M_A_S and CERTREQ payload in the I_S_I response | SGW includes M_A_S but not CERTREQ payload in the I_S_I response | SGW does not include M_A_S but includes CERTREQ payload in the I_S_I response | SGW does not include M_A_S or CERTREQ payload in the I_S_I response |
| IKE_AUTH request message | H(e)NB does not include AUTH, M_A_S & A_A_F notification payloads in the first IKE_AUTH request message | Case 13: This is an error condition. | Case 14: This is an error condition. | Case 15: This is an error condition. | Case 16: EAP-AKA based device authentication. |

Cases 1, 6, 11, and 16 result in valid requirement/response pairs. All other cases result in error conditions, in which case the SGW's decision on outcome should depend on operator policy. The policy decision may in addition be based on the SGW's knowledge of the authentication capabilities of the H(e)NB. For example, based on the H(e)NB ID provided by the H(e)NB in the IKE_SA_INIT request message, the SGW can derive the authentication capabilities profile of the H(e)NB from a H(e)NB authentication information server which stores the H(e)NB authentication information profile, e.g. the authentication type of the H(e)NB. The SGW can decide whether to request certificate-based device authentication or EAP-AKA based authentication, based on the authentication profile. The H(e)NB authentication information server is not necessarily implemented as a physical server, but may be co-located with other functions.

Figure 6:
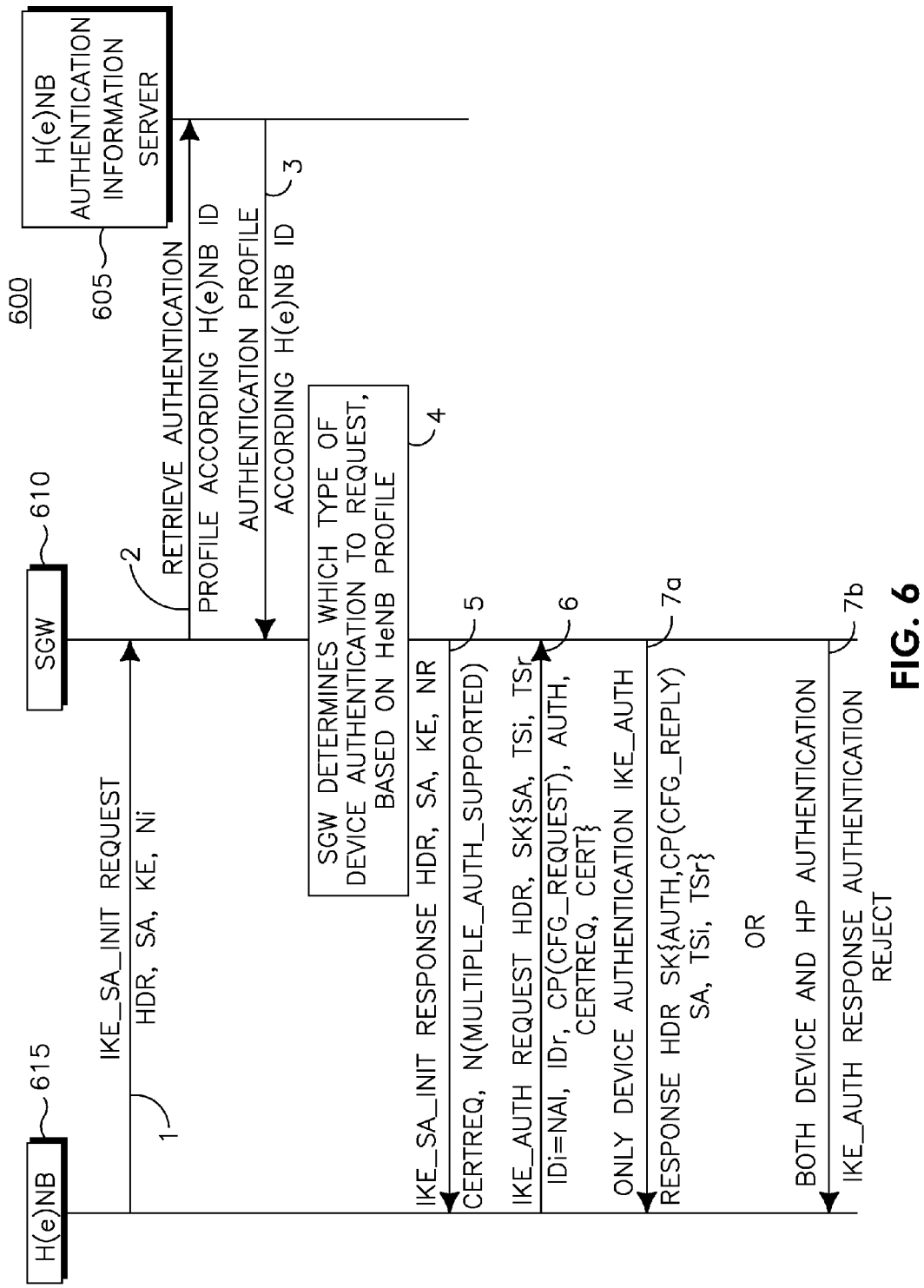
FIG. 6 is an example flowchart for profile based authentication.

Referring to FIG. 6, an embodiment of a method 600 using profile information from a H(e)NB authentication information server 605 is shown. A SGW 610 should fetch the authentication profile from H(e)NB authentication information server 605 (2 and 3) based on a received H(e)NB identity from H(e)NB 615 (1). SGW 610 then determines which type of device authentication to request according to the H(e)NB 615 authentication profile (4). SGW 610 sends an IKE_SA_INIT response (5).

If the authentication type implies "only device authentication" should be performed, SGW 610 will accept the IKE_AUTH request (6) from H(e)NB 615. SGW 610 sends the AUTH response message to H(e)NB 615 and continues the authentication procedure (7a).

If the authentication type implies "both device and HP authentication" should by performed, SGW 610 will send a IKE_AUTH response with an 'Authentication Reject' message to indicate to H(e)NB 615 to follow the previous IKE_AUTH request message (6) with another IKE_AUTH request message for hosting party authentication (7b). The Authentication Reject message is only for the purpose of indicating to H(e)NB 615 to follow up with hosting party authentication, and does not imply that SGW 610 will discard the information regarding device authentication obtained in the previous IKE_AUTH request message (6). Instead, SGW 610 retains the information from the previous IKE_AUTH request message (6), and uses it to send an eventual Authentication Success (or Reject) message to H(e)NB 615, after H(e)NB 615 follows the device authentication IKE_AUTH request with another IKE_AUTH request containing the authentication information for the hosting party authentication. SGW 610 will perform 7a and 7b depending on the authentication profile of H(e)NB 615 that SGW 610 retrieved.

The following authentications are needed for H(e)NB authentication. First, mutual authentication of the H(e)NB device and the operator's network needs to be done. Authentication methods using the credentials stored in the TrE should be executed inside of the TrE. This mutual authentication shall include (or be tightly bound to) a validation of the platform integrity (i.e. TrE properties). The two parts of the mutual authentication have the following properties: 1) the identity of the H(e)NB is authenticated by the network and the credentials for this authentication shall be stored in the TrE in the H(e)NB; and 2) the identity of the operator's network (e.g. represented by SGW) is authenticated by the TrE of the H(e)NB and this authentication may either authenticate the operator's network in general, or the particular SGW contacted by the H(e)NB. The identity of the SGW could be authenticated by the TrE identifying the use of a private cipher key belonging to the SGW in the message sent from the SGW, where such a private key is known to the TrE because it is held in a SGW certificate that the TrE can refer to. The TrE could securely store and handle this SGW certificate. The SGW certificate can be sent to the TrE within a suitable IKEv2 message from the SGW. The TrE can be pre-configured with, and subsequently securely store and handle a root certificate and use it to verity the SGW certificate. Alternatively, the TrE may contact an external certificate authority such as an online certificate status protocol (OCSP) server to verity the SGW certificate.

Also needed, when applicable, is the authentication of the hosting party by the operator's network. The identity of the hosting party is authenticated by the operator's network. This authentication may be performed in two ways: 1) authentication of the hosting party is based on credentials contained in a separate Hosting Party Module (HPM) in H(e)NB and is performed as an additional step over mutual authentication; or 2) the authentication of the hosting party is bundled with the device authentication, i.e. there is no additional authentication step after mutual authentication. If no hosting party exists (e.g. the operator itself provides the H(e)NB), then this latter authentication may not be relevant.

Although the current basic security protocols provide for secure communication, including device and hosting-party authentication, between a H(e)NB and the core network, the current protocols present some problems, in that they only provide 'authentication' information, but not much else, about the H(e)NB or the (optional) HPM within it. Since H(e)NBs are likely to be left to operate in relatively insecure physical environments (e.g., people's homes), 'authentication' using known secrets may not be enough, and the security protocols may need to explicitly use information about the 'expected state' of the TrE and/or the H(e)NB or any of its components, as an integral step for accessing the SGW. This step is called device validation procedure.

Specifically, the security protocols that use IKEv2 for authentication and security association set-up between the H(e)NB and SGW, do not include any information other than the H(e)NB equipment ID (H(e)NB_EI) and the hosting party ID (H_ID). Although these IDs are securely protected within the TrE and the optional HPM, respectively, their presence (and integrity) may not be sufficient, in terms of validating, that the H(e)NB being validated can be trusted for interaction with the core network.

Accordingly, embodiments of security protocols or methods are disclosed.

In one embodiment, a pre-requisite for the mandatory device (and optional hosting-party) authentication is an integral boot-up and system-state achievement by the TrE at boot time and possibly also at run-times (either scheduled or event-driven).

In another embodiment, during or after the IKE NIT phases, the H(e)NB sends in appropriate IKEv2 payload(s) (such as the CP or V payloads, or a Notify (N) message), information that indicates its trustworthiness as a platform. Such information may include a certificate or a statement that describes the expected state of the TrE, the H(e)NB, or any (combination of) components including the HPM, or even a list of components that fail a local integrity check process performed by the TrE or other components of the H(e)NB. This information can be signed by a private key protected within the TrE.

In another embodiment, a certificate that can be verified with a CA or a TTP (such as TrE or H(e)NB manufacturer/supplier) could also be distributed (either by the H(e)NB sending it to the HLR/AAA via the SGW, or by assuming the HLR/AAA obtains them from out-of-band processes). Such a certificate certifies the public key for the private key held within the TrE. Use of the private key, therefore, would signify that the TrE or other parts of the H(e)NB are intact. During the IKEv2 exchange, the H(e)NB may also indicate to the core network which components of the H(e)NB should be validated for authenticity or integrity. A component-specific key may be used by the TrE to sign and vouch for the validity of the specific component. If certificates or statements for the TrE or any other part of the H(e)NB are to be carried in the protocol itself, the IKEv2 parameters, such as CP and V, may be used to convey that information. Such information may alternatively be carried in a Notify (N) field in the IKE_AUTH request message from the H(e)NB to the SGW. Such a field may also include information about the process, entity, and/or outcome of any device validation and integrity check performed by the TrE or other parts of the H(e)NB. Protection by the SK{ } mechanism may also be considered.

In another embodiment, either through certificates (pre-distributed or exchanged in protocol time), or through explicit messaging (possibly protected for integrity and confidentiality), the H(e)NB indicates to the SGW, and via the SGW, to the core network, information about the TrE itself that will be useful for the core network to assess the kind of communication, access, and application privileges the H(e)NB may warrant. Such information could again be included in the IKEv2 and carried on a suitable existing parameter.

In another embodiment, a communication protocol different from the IKEv2 can be used for combined authentication and device validation of the H(e)NB. Examples of such protocols could include, but are not limited to, Transport Layer Security (TLS), Broadband Forum Technical Requirements (TR) 069, Open Mobile Alliance (OMA) Device Management (DM) protocols, or some suitable Internet Engineering Task Force (IETF) Requests for Comments (RFCs) for extensions of the TLS where device authentication and device validation messages can be indicated in a combined manner.

In accordance with the disclosed authentication protocol embodiment, as part of, or as a pre-requisite procedure, the TrE may set up secure channels between the TrE and other parts of the H(e)NB, including the MPU, HPM (if included), cellular modem processor, non-cellular modem processors, location/positioning device, and/or clock/timing device. Evidence of the establishment of such secure channels would then be conveyed to the HLR/AAA via the SGW, from the H(e)NB, under encrypted protection using keys protected by the TrE. The HLR/AAA could then use such information to assess trustworthiness of the H(e)NB as part of, or as a pre-requisite for, H(e)NB and/or hosting-party authentication.

In another embodiment, the TrE may be used to define and enforce a particular system state for the H(e)NB, or any of its components, including the HPM, location/positioning devices, or clock/timing devices for application-layer communication access to application or service servers. As such, an H(e)NB may be 'booted' and achieve 'network level security association', using IKEv2, with the HLR/AAA, following a secure boot-up of the TrE, and of any other part of the H(e)NB under supervision of the securely-booted TrE. Afterwards, however, the TrE may also, under operator or service provider security policies, perform additional 'system state' checks for itself and/or any other part of the H(e)NB before allowing application or service-level authentication to specific application servers. Such services may include OAM services, and services for updating H(e)NB location and/or reference timing.

Figure 7:
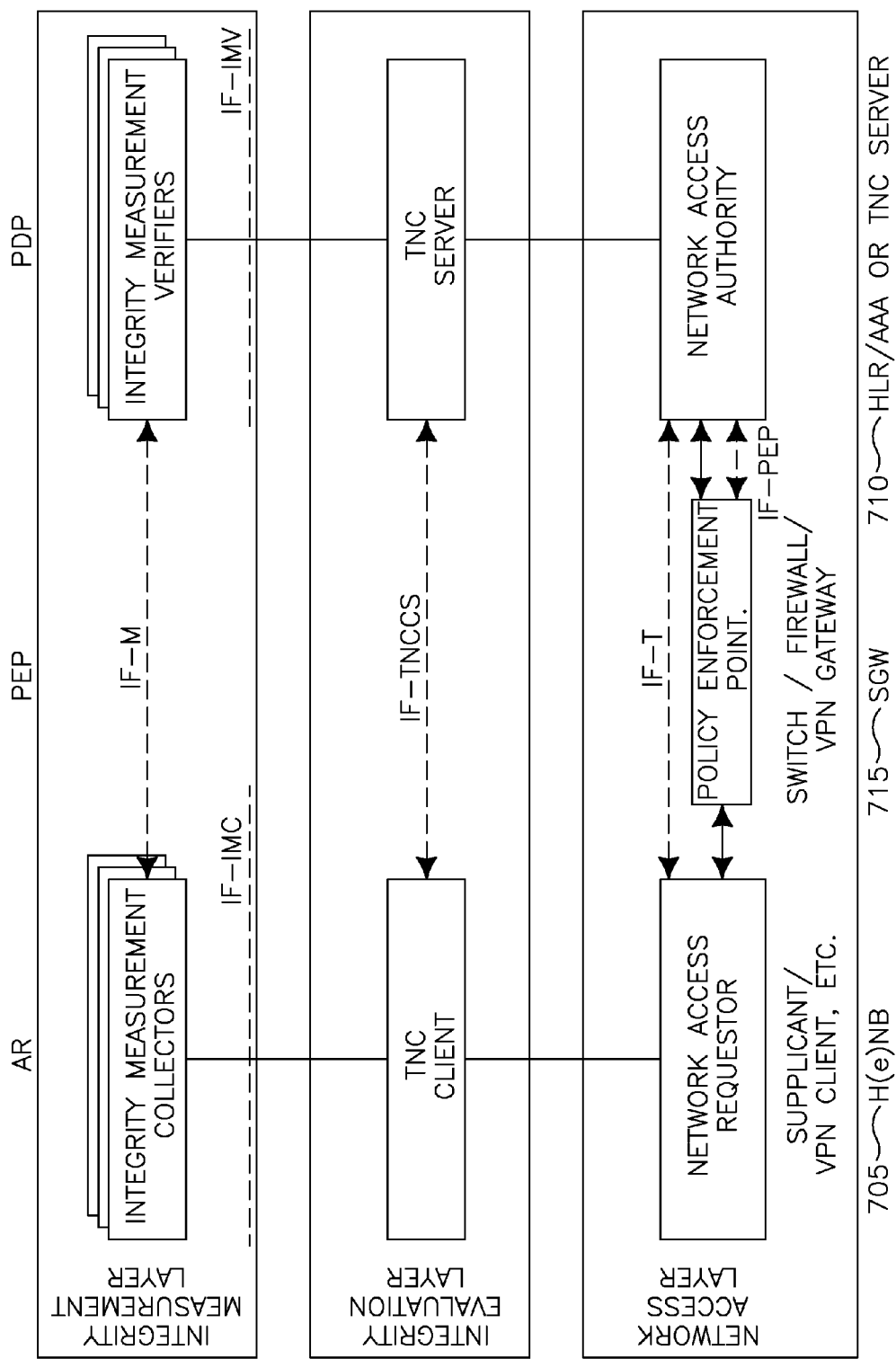
FIG. 7 is a relational diagram showing an example security protocol.

In another embodiment shown as a relationship diagram in FIG. 7, the security protocol may also include procedures whereby a H(e)NB's 705 trustworthiness is assessed, and its access rights (for network and application accesses) determined, by either a HLR/AAA 710 or a core-network entity that acts as a Trusted Computing Group (TCG) Trusted Network Connect (TNC) Policy Decision Point (PDP). The access-control policy will then be enforced by a SGW 715 acting as a TCG TNC Policy Enforcement Point (PEP). H(e)NB 705, therefore, will act as a TCG TNC Access Requestor (AR).

In another embodiment, in the context of the security protocols such as those for authentication, the H(e)NB, acting as TNC AR, provides integrity metrics either on its own, or by request from a SGW or a HLR/AAA. Such integrity metrics would then be forwarded to the HLR/AAA via the SGW, where the HLR/AAA acts as the TCG TNC PEP. Upon assessing whether the integrity metrics received from the H(e)NB meet required 'trust levels', the HLR/AAA then determines the level of network access to be granted to the H(e)NB. Such 'level' could include granular combination of service scopes, bandwidths, traffic types and volumes, application access for the H(e)NB, and/or any WTRUs that communicate with the core network through the H(e)NB, etc. The policy decision then is forwarded from the HLR/AAA to the SGW, which then acts as a TNC PEP and enforces the access-control policy from the HLR/AAA that governs the granted access for the H(e)NB. Also shown in FIG. 7 are the relevant TNC specifications (e.g., IF-M, IF-IMC, IF-IMV, IF-TNCCS, IF-T, and IF-PEP) for this example architecture.

As part of the device and/or hosting-party authentication protocol, the location of the H(e)NB as well as an 'event description or log' of H(e)NB's operation is disclosed with a local time-stamp such as a time-stamped version of a secure boot-up history of the TrE and/or the H(e)NB, supplied by the H(e)NB's own timing function, included as part of the information that gets conveyed from the H(e)NB to the HLR/AAA via the SGW. Such location information and/or the time-stamped 'event description or log' information is encrypted with keys protected within the TrE. The HLR/AAA then assesses the trustworthiness of the H(e)NB not just with the H(e)NB_EI or the HPM_ID, but also the information including one or more of the locations of the H(e)NB, and/or the time-stamped 'event description and/or log' concerning the H(e)NB.

For the disclosed security protocols above, suitable IKEv2 payloads, such as the CP or the V, or the Notify Message (N) may be used to carry the additional information between the H(e)NB and the core-network (and the SGW).

Figures 8A, 8B:
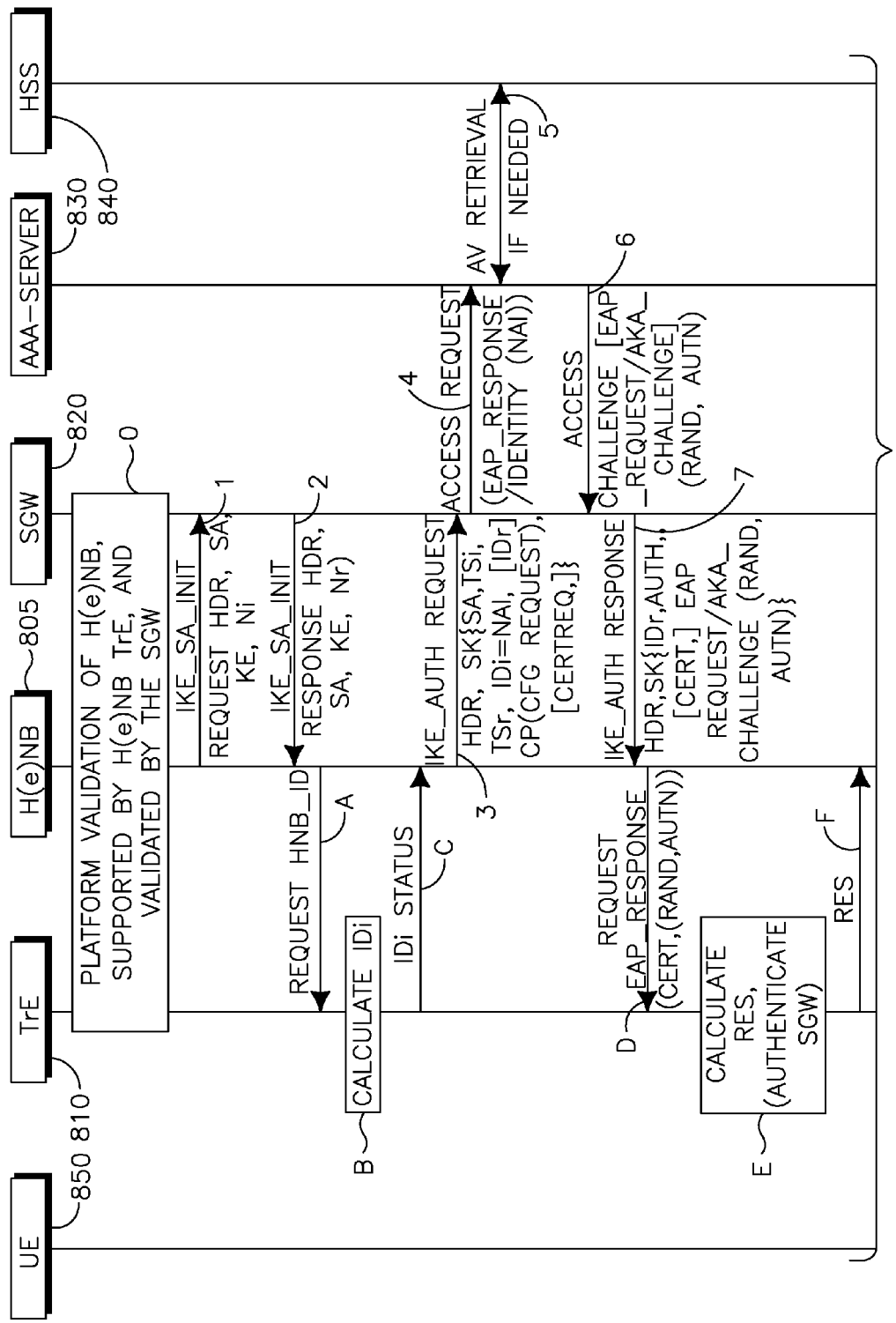
FIGS. 8(A) and 8(B) are an example signal diagram for Extensible Authentication Protocol—Authentication and Key Agreement (EAP-AKA)
Figure 8B:
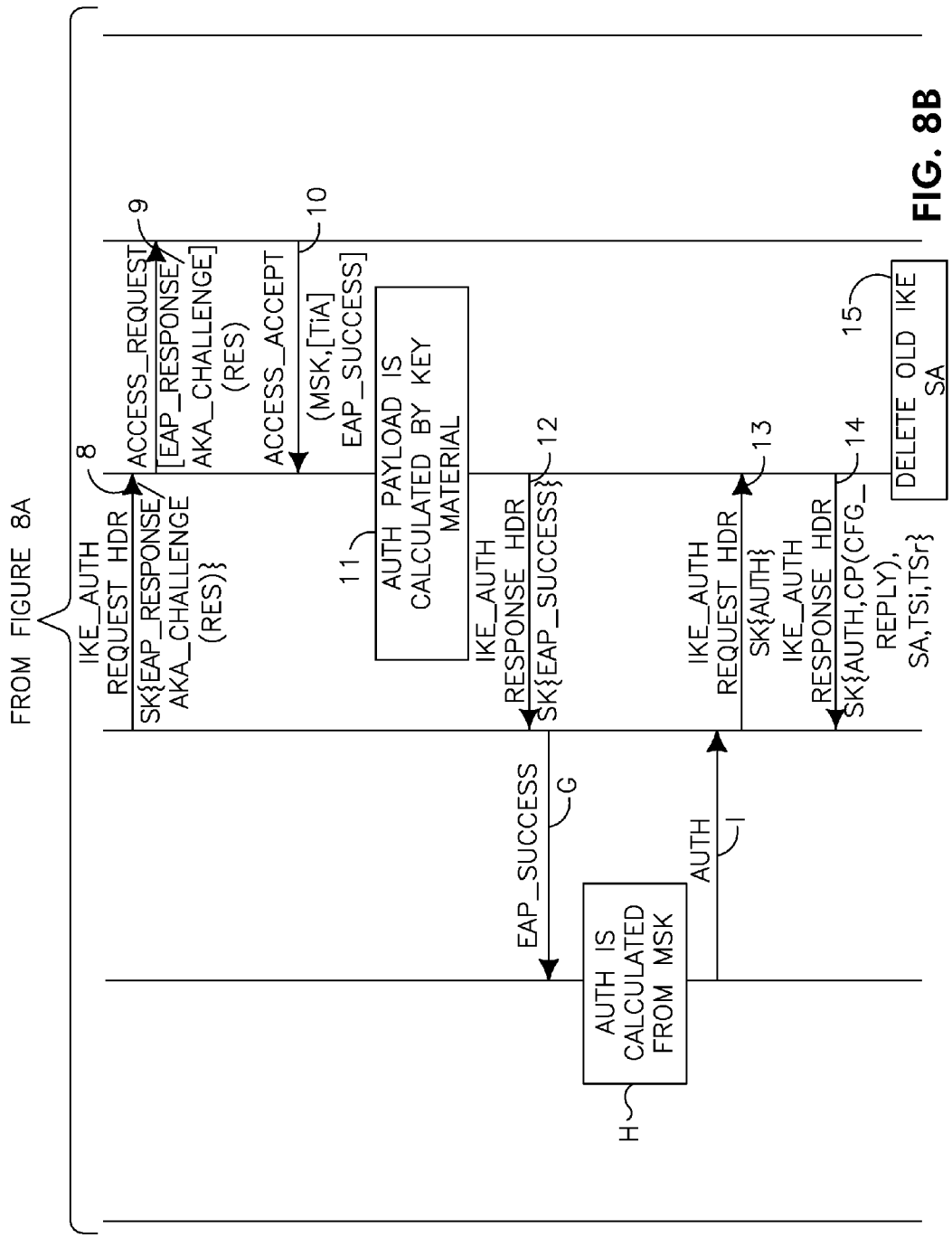

Referring now to FIGS. 8(A) and 8(B), there is shown an example signal diagram of an EAP-AKA based authentication. The authentication protocol of FIGS. 8(A) and 8(B) make use of the strong security properties of TrE 810 to bolster the overall security of the EAP-AKA based device authentication protocol for the H(e)NB 805. It may be noted that the steps that are indexed with alphabet letters (e.g. A, B, C, etc) involve interaction between TrE 810 and other functions of H(e)NB 805, for the purpose of the device authentication.

As a pre-requisite for device authentication, H(e)NB 805 needs to validate itself to SGW 820 as a trustworthy platform (0). H(e)NB 805 depends on its TrE 810 to securely provide cryptographically protected evidence of the platform validity for H(e)NB 805, which H(e)NB 805 then forwards to SGW 820. SGW 820 evaluates the evidence and determines if H(e)NB 805 is trustworthy enough to allow it to continue on to perform device authentication.

H(e)NB 805 sends an IKE_SA_INIT request to SGW 820 (1). SGW 820 sends an IKE_SA_INIT response (2). H(e)NB 805 requests HNB_ID from TrE 810 by forwarding IKE_SKA_INIT response to TrE 810 (A). TrE 819 checks the integrity of the IKE_SKA_INIT response and composes IDi from HNB_ID (B). TrE 810 sends to H(e)NB 805 the IDi payload and status (stating, e.g., completion of the composition of the IDi from HNB_ID by TrE 810) (C).

H(e)NB 805 sends the IDi payload to SGW 820 and begins negotiation of child security associations (3). AUTH is omitted to inform SGW 820 that H(e)NB 805 wants to perform EAP authentication. Configuration payload is carried in this message if H(e)NB's 805 remote IP address needs to be configured dynamically. H(e)NB 805 also requests a certificate from SGW 820. Note that the user profile selected by the network address identifier (NAI) presented in the IDi payload enforces the choice of authentication (certificate, EAP-AKA, or certificate-EPA-AKA multiple authentication).

SGW 820 sends the Authentication Request message with empty EAP attribute value pairs (AVP) to the AAA Server 830, containing the identity received in IKE_AUTH request message (4). If necessary, the AAA Server 830 shall fetch the device profile and authentication vectors from HSS/HLR 840 or some other authenticating entity (5). AAA Server 830 then initiates the authentication challenge (6).

SGW 820 sends an IKE_AUTH response to H(e)NB 805 (7). The EAP message received from AAA Server 830 (EAP-Request/AKA-Challenge) is included in order to start the EAP procedure over IKEv2. SGW's 820 identity, a certificate, and the AUTH parameter which is used to protect the previous message (in the IKE_SA_INIT exchange) is sent to H(e)NB 805 in this message in case H(e)NB's TrE 810 needs to authenticate SGW 820 based on the certificate of SGW 820.

Material needed for SGW 820 authentication and calculating the response to the authentication challenge is forwarded to TrE 810 (D). TrE 810 calculates RES from RAND, AUTN, and optionally checks the authentication parameters in case H(e)NB 805 needs to authenticate SGW 820 based on the certificate of SGW 820 (E). TrE 810 delivers RES to H(e)NB 805 together with an optional status message on the success of SGW 820 authentication (F).

H(e)NB 805 responds to the authentication challenge (8). The only payload (apart from the header) in the IKEv2 message is the EAP message. SGW 820 forwards the EAP-Response/AKA-Challenge message to AAA Server 830 (9). When all checks are successful, AAA Server 830 sends the Authentication Answer including an EAP success and the key material to SGW 820 (10). This key material shall consist of the maser session key (MSK) generated during the authentication process.

The MSK shall be used by SGW 820 to generate the AUTH parameters in order to authenticate the IKE_SA_INIT phase messages (11). The EAP Success message is forwarded to H(e)NB 805 over IKEv2 (12). The EAP Success message is forwarded to TrE 810 (G). TrE 810 uses its own copy of the MSK as an input to generate the AUTH parameter to authenticate the first IKE_SA_NIT message (H). TrE 810 then forwards AUTH to H(e)NB 805 (I).

H(e)NB 805 composes IKE_AUTH request and sends it with the AUTH parameter to SGW 820 (13). SGW 820 then checks the correctness of the AUTH received from H(e)NB 805 and calculates the AUTH parameter which authenticates the second IKE_SA_INIT message. SGW 820 shall send the assigned Remote IP address in the configuration payload (CFG_REPLY) if H(e)NB 805 requested a Remote IP address through the CFG_REQUEST. Then the AUTH parameter is sent to H(e)NB 805 together with the configuration payload, security associations and the rest of the IKEv2 parameters and the IKEv2 negotiation terminates (14).

If SGW 820 detects that an old IKE SA for that H(e)NB 805 already exists, it will delete the IKE SA and send H(e)NB 805 INFORMATIONAL exchange with a Delete payload in order to delete the old IKE SA in H(e)NB 805 (15).

Figure 9:
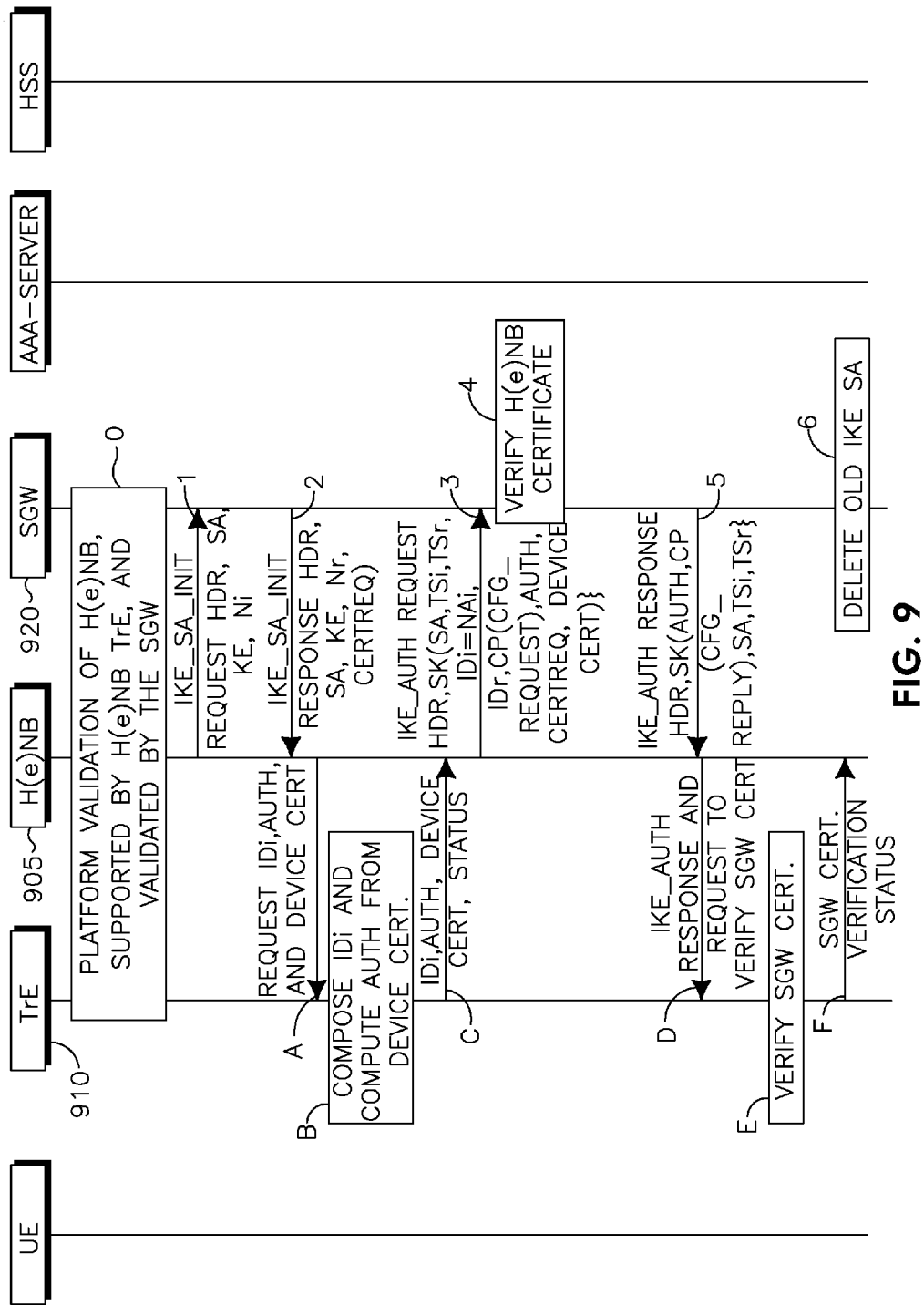
FIG. 9 is an example flow diagram for device authentication.

In another embodiment, a protocol for device authentication may be based on certificates as shown with reference to FIG. 9. The IKEv2 certificate-based mutual authentication is executed according to RFC-4306 Internet Key Exchange (IKEv2) Protocol. The certificate handling and profiles may adhere to given specifications, although certificate enrollment and certificate revocation may not be required due to both the complexity of implementing formal certificate enrollment and revocation processes and also the likely availability of a simpler alternatives, such as the use of a blacklist or whitelist to deal with devices that fail authentication checks due to expiry or other problems with their device certificates. It is noted that the steps that are indexed with alphabet letters (e.g. A, B, C, etc) in FIG. 9 involve interaction between TrE 910 with other functions of H(e)NB 905 for the purpose of device authentication.

As a pre-requisite for EAP-AKA based device authentication, H(e)NB 905 needs to validate itself to SGW 920 as a trust-worthy platform (0). H(e)NB 905 depends on its TrE 910 to securely provide cryptographically protected evidence of the platform validity for H(e)NB 905, which H(e)NB 905 then forwards to SGW 920. SGW 920 evaluates the evidence and determines if H(e)NB 905 is trustworthy enough to allow it to continue on to perform device authentication.

H(e)NB 905 sends an IKE_SA_INIT request to SGW 920 (1). SGW 920 sends IKE_SA_INIT response, requesting a certificate from H(e)NB 905 (2). H(e)NB 905 requests HNB_ID from TrE 910 by forwarding IKE_SKA_INIT response to TrE 910 (A). TrE 910 checks the integrity of the IKE_SKA_INIT response, composes IDi from HNB_ID, fetches the device CERT, and computes AUTH using the device CERT (B). TrE 910 sends to H(e)NB 905 the IDi, AUTH, CERT, and status (stating, e.g., completion of the composition of the IDi from HNB_ID, computation of the AUTH, retrieval of the CERT, etc by TrE 910) (C).

H(e)NB 905 sends the IDi payload and begins negotiation of child security associations (3). H(e)NB 905 also sends the AUTH payload, its own certificate, and a request for a certificate from SGW 920. Configuration payload is carried in this message if H(e)NB's 905 remote IP address needs to be configured dynamically. The user profile selected by network address identifier (NAI) presented in the IDi payload enforces the choice of authentication (certificate, EAP-AKA, or certificate-EPA-AKA multiple authentication).

SGW 920 checks the correctness of the AUTH received from H(e)NB 905 and calculates the AUTH parameter which authenticates the second IKE_SA_INIT message (4). SGW 920 verifies the certificate received from the H(e)NB 905. SGW 920 sends the AUTH parameter and its certificate to H(e)NB 905 together with the configuration payload, security associations, and the rest of the IKEv2 parameters and the IKEv2 negotiation terminates (5). The Remote IP address is assigned in the configuration payload (CFG_REPLY) if H(e)NB 905 requested a Remote IP address through the CFG_REQUEST.

H(e)NB 905 forwards SGW's 920 certificate to TrE (910) (D). TrE 910 verifies SGW's 920 certificate with its securely stored root certificate (E). H(e)NB 905 may further validate SGW's 920 certificates. TrE 910 forwards the status of the SGW CERT verification to HeNB 905 (F). If SGW 920 detects that an old IKE SA for that H(e)NB 905 already exists, it will delete the IKE SA and send H(e)NB 905 an INFORMATIONAL exchange with a Delete payload in order to delete the old IKE SA in H(e)NB 905 (6).

A combined certificate-based device authentication followed by hosting-party authentication, where both the TrE and the HPM (e.g. UICC) have to interact with the rest of the H(e)NB and the SGW may be utilized. Particularly, the TrE may protect any information that the HPM generates or receives for the purpose of authentication of the hosting-party or the device. Further, the TrE may set up a secure channel with the HPM, so that any information the HPM receives or sends during the authentication protocol may be protected by the secure channel.

Figures 10A, 10B:
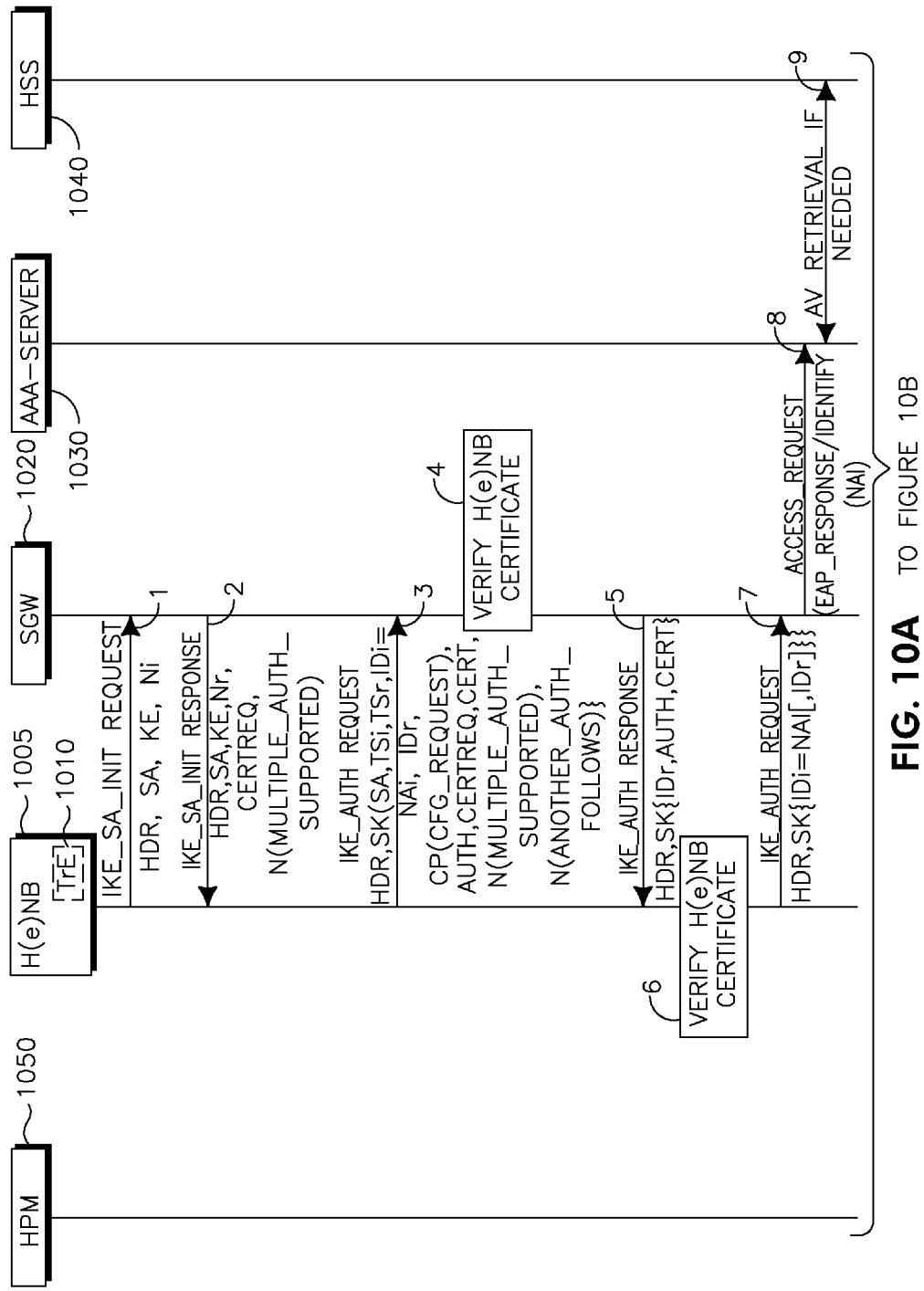
FIGS. 10(A) and (B) are an example flow diagram for device and hosting party authentication.
Figure 10B:
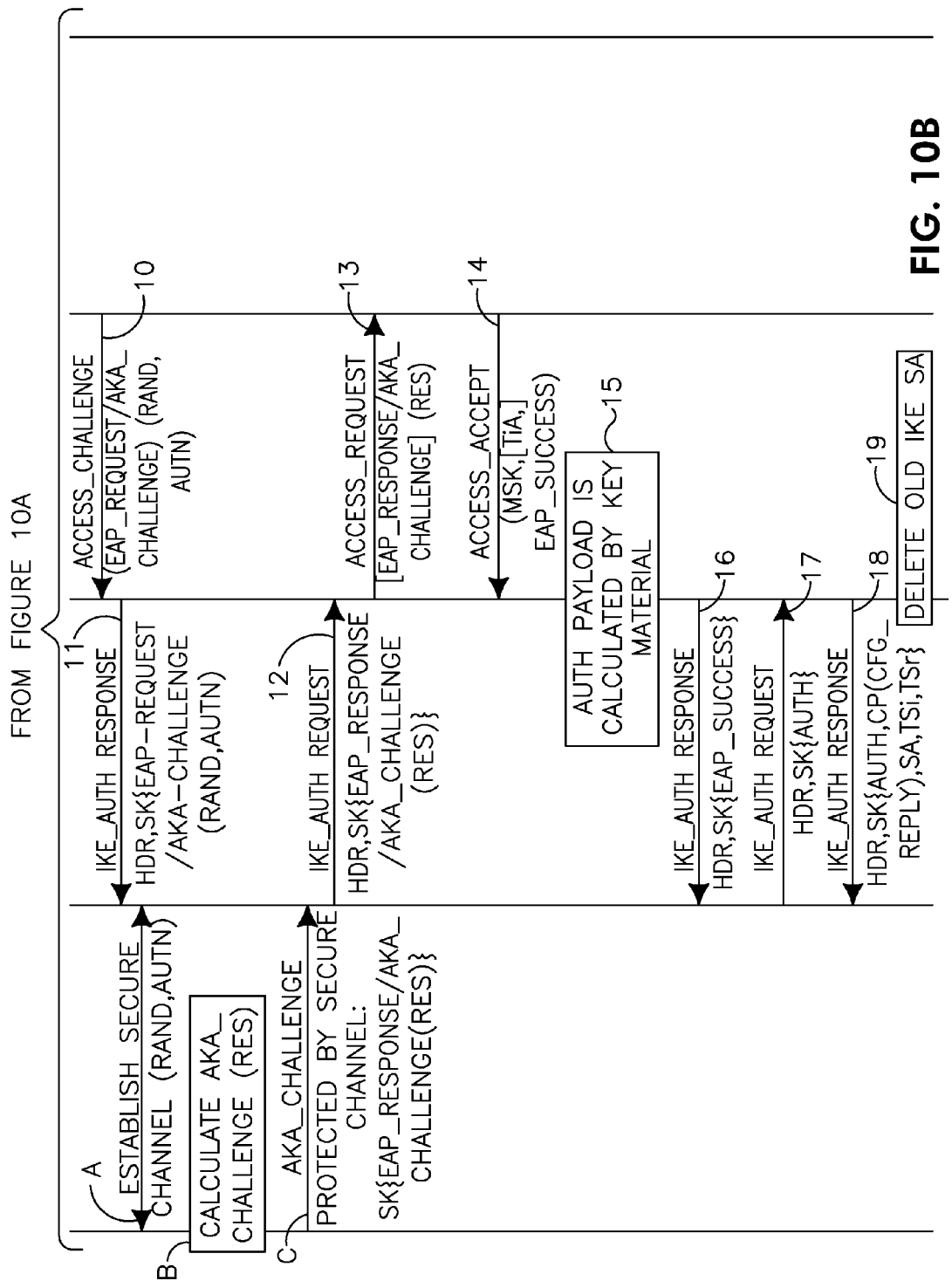

FIGS. 10(A) and 10(B) show an embodiment of a signal diagram of a combined EAP-AKA and certificate based authentication. The steps that are indexed with alphabet letters (e.g. A, B, C, etc) in FIGS. 10(A) and (B) involve interaction between TrE 1010 with other functions of H(e)NB 1005, including HPM 1050, for the purpose of this combined authentication procedure.

The signal flow shows the certificate based mutual authentication between H(e)NB 1005 and SGW 1020, followed by an EAP-AKA auth exchange between the H(e)NB 1005 and AAA server 1030. Initially, H(e)NB 1005 sends an IKE_SA_INIT request to SGW 1020 (1). SGW 1020 sends IKE_SA_INIT response, requesting a certificate from H(e)NB 1005 (2). SGW 1020 indicates that it supports Multiple Authentication by including the MULTIPLE_AUTH_SUPPORTED payload.

H(e)NB 1005 begins negotiation of child security associations (3). First, H(e)NB 1005 requests TrE 1010 to compose the IDi payload (from the HeNB_EI), and compute and forward to it the encrypted package:

SK{SA, TSi, TSr, IDi=NAL IDr, CP(CFG_REQUEST), AUTH, CERTREQ, CERT, N(MULTIPLE_AUTH_SUPPORTED), N(ANOTHER_AUTH_FOLLOWS)}

H(e)NB 1005 forwards to SGW 1020 the IKE_AUTH request which consists of the header (HDR) and the encrypted payload SK{...}. The encrypted payload includes the AUTH payload, H(e)NB's 1005 own certificate, and also a request for a certificate from SGW 1020. Configuration payload is carried in this message if the H(e)NB's 1005 remote IP address needs to be configured dynamically. H(e)NB 1005 indicates that it support Multiple Authentication and that it wants to do a second authentication by including the MULTIPLE_AUTH_SUPPORTED and ANOTHER_AUTH_FOLLOWS attributes. The user profile selected by NAI presented in the IDi payload enforces the choice of authentication (certificate, EAP-AKA, or certificate-EPA-AKA multiple authentication).

SGW 1020 checks the correctness of the AUTH received from H(e)NB 1005 and calculates the AUTH parameter which authenticates the second IKE_SA_NIT message (4). SGW 1020 verifies the certificate received from H(e)NB 1005. SGW 1020 sends the AUTH parameter and its certificate to H(e)NB 1005 (5).

H(e)NB 1005 forwards the encrypted payload SK{IDr, AUTH, SGW Certi} to TrE 1010, which decrypts the payload and extracts IDr, AUTH, and SGW Certi. TrE 1010 then verifies SGW's 1020 certificate with its stored root certificate (6). H(e)NB 1005 may further validate SGW's 1020 certificates, as it is under control of the operator.

H(e)NB 1005 requests TrE 1010 to form the encrypted part of another IKE_AUTH request message, where the AUTH payload is omitted to inform SGW 1020 that H(e)NB 1005 wants to perform EAP authentication (7). The encrypted part is SK{IDi=NAL IDr}. H(e)NB 1005 then prepares a header (HDR) and sends HDR, SK{IDi=NAL IDr} to SGW 1020.

SGW 1020 sends the Authentication Request message with an empty EAP AVP to AAA Server 1030, containing the identity received in IKE_AUTHrequest message (8). The AAA Server 1030 shall fetch the user profile and authentication vectors from home subscriber server/home location register (HSS/HLR) 1040 (9). AAA Server 1030 initiates the authentication challenge (10).

SGW 1020 sends IKE_AUTH response to H(e)NB 1005 (11). The EAP message received from AAA Server 1030 (EAP-Request/AKA-Challenge) is included in order to start the EAP procedure over IKEv2. SGW's 1020 identity, a SGW certificate, and the AUTH parameter which is used to protect the previous message it sent to H(e)NB 1005 (in the IKE_SA_INIT exchange) are included in this message in case that H(e)NB 1005 needs to authenticate SGW 1020 based on the certificate of SGW 1020.

TrE 1010 establishes a secure channel to HPM 1050 by first exchanging security associations (SA). As a result of such a secure channel establishment, the TrE 1010 as well as the HPM 1050 then both become bound to the authentication session using RAND and AUTN. The TrE 1010 then forwards an authentication challenge to the HPM 1050 (A).

HPM 1050 calculates the AKA response (RES) (B). HPM 1050 sends the AKA response (RES) over the secure channel to TrE 1010 (C).

H(e)NB 1005 responds to the authentication challenge (12). The only payload (apart from the header) in the IKEv2 message is the EAP message, which includes the RES computed by HPM 1050 and then encrypted over IKEv2 by TrE 1010 and then forwarded to H(e)NB 1005. H(e)NB 1005 checks the authentication parameters in case H(e)NB 1005 needs to authenticate SGW 1020 based on the certificate of SGW 1020.

SGW 1020 forwards the EAP-Response/AKA-Challenge message to AAA Server 1030 (13). When all checks are successful, AAA Server 1040 sends the Authentication Answer including an EAP success and the key material to SGW 1020 (14). This key material shall consist of the MSK generated during the authentication process. The MSK shall be used by SGW 1020 to generate the AUTH parameters in order to authenticate the IKE_SA_INIT phase messages (15). The EAP Success message is forwarded to H(e)NB 1005 over IKEv2 (16).

H(e)NB 1005 forwards the encrypted EAP Success message (i.e. SK{EAP Success message}) to TrE 1010 (17). TrE 1010 shall take its own copy of the MSK as input to generate the AUTH parameter to authenticate the first IKE_SA_NIT message. The AUTH parameter is sent from TrE 1010 to H(e)NB 1005, encrypted over IKEv2. H(e)NB 1005 sends to SGW 1020 the encrypted AUTH parameter.

SGW 1020 decrypts and checks the correctness of the AUTH received from H(e)NB 1005 and calculates the AUTH parameter which authenticates the second IKE_SA_INIT message (18). SGW 1020 shall send the assigned Remote IP address in the configuration payload (CFG_REPLY) if H(e)NB 1005 requested it for a Remote IP address through the CFG_REQUEST. Then the AUTH parameter is sent to H(e)NB 1005 together with the configuration payload, security associations and the rest of the IKEv2 parameters and the IKEv2 negotiation terminates.

If SGW 1020 detects that an old IKE SA for that H(e)NB 1005 already exists, it will delete the IKE SA and send H(e)NB 1005 an INFORMATIONAL exchange with a Delete payload in order to delete the old IKE SA in H(e)NB 1005 (19).

Binding of the H(e)NB TrE, the HPM, and the H(e)NB itself, during the authentication procedure may be utilized. Some assumptions are made. It is given that most pieces of equipment have unique IDs. For example, the H(e)NB_EI is assigned by manufacturer of the H(e)NB, the TrE_ID is assigned by the manufacturer of the TrE and the HPM_ID is assigned by the manufacturer of the HPM. It is also understood that the SGW, representing operator's core network, performs mutual authentication with the H(e)NB. And it is known that the HLR/AAA server includes the Home Location Register (HLR) for H(e)NB as well as the Authentication Center. The HLR stores the records of H(e)NB_EIs and TrE IDs corresponding to every HPM_ID, representing the binding relationship of the TrE, H(e)NB, and the HPM by use of their respective IDs, that is, the TrE_ID, H(e)NB_EI, and the HPM_ID. The AAA server performs binding authentication based on these records.

An embodiment for a method of binding the 3 IDs is disclosed. The H(e)NB forwards to the SGW the H(e)NB_EI, TrE_ID, and optional HPM_ID. The SGW forwards the H(e)NB_EI it receives from the H(e)NB to the HLR/AAA server. The HLR/AAA server finds the TrE_ID and the HPM_ID corresponding to the H(e)NB_EI that it has in its records. If the TrE_ID and the HPM_ID found in the HLR's records are the same as those the SGW received from the H(e)NB, then it can be ascertained that the H(e)NB is the legitimate equipment binding to the TrE and the HPM.

For the trustworthiness of the authentication assertions conveyed by the protocols described below, all sensitive data may remain protected by the TrE and the HPM. In particular, authentication secrets of the H(e)NB, representing the binding authentication of the H(e)NB and the H(e)NB_EI, may be securely stored in the TrE. The TrE may also securely store the TrE_ID. Furthermore, the HPM_ID and corresponding authentication secrets may also be securely stored in and processed only by the HPM. Secure channels may be used to transport this data from either the TrE or the HPM to the SGW.

Figure 11:
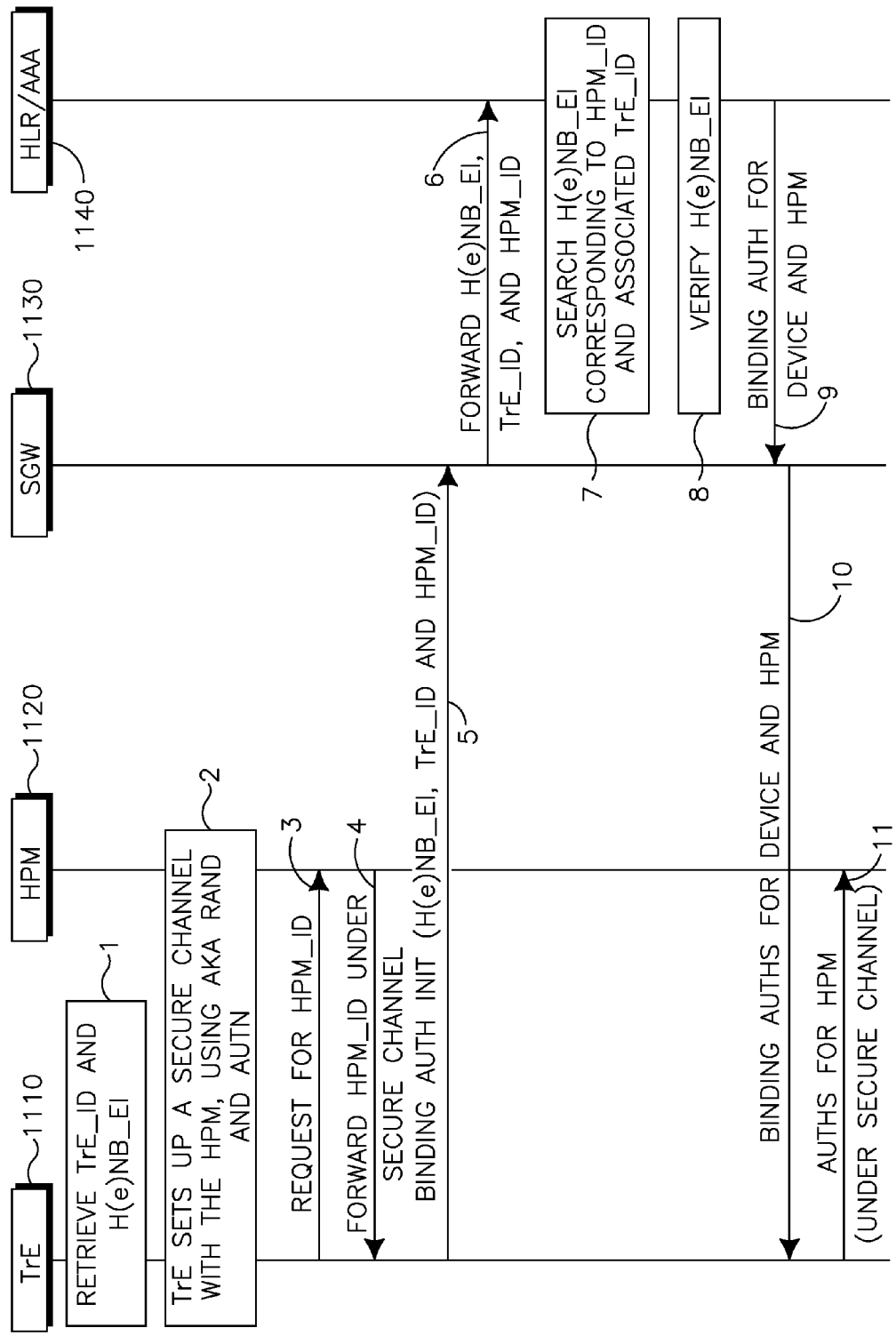
FIG. 11 is an example flow diagram for three way binding.

FIG. 11 illustrates an embodiment of a three-way binding authentication. Initially, TrE 1110 retrieves the TrE_ID and the H(e)NB_EI that it securely holds (1). TrE 1110 then sets up a secure channel with HPM 1120 using AKA RAND and AUTN (2). TrE 1110 requests and receives the HPM_ID from HPM 1120 (3). The HPM_ID is sent over and protected under the secure channel (4). TrE 1110 then forwards the TrE_ID, H(e)NB_EI, and HPM_ID, to SGW 1130 (5).

SGW 1130 forwards the TrE_ID, H(e)NB_EI, and HPM_ID to HLR/AAA 1140 (6). After receiving these IDs, the HLR part of HLR/AAA 1140 searches for the H(e)NB_EI corresponding to the TrE_ID and the HPM_ID (7). The AAA part of HLR/AAA 1140 then verifies the H(e)NB_EI it received from SGW 1130 with the H(e)NB_EI that corresponded to the TrE_ID and the HPM_ID (8). The HLR part of HLR/AAA 1140 then sends to SGW 1130 the binding authentication for TrE 1110 and HPM 1120 (9). SGW 1130 next forwards the binding authentication for TrE 1110 and HPM 1120 to TrE 1110 (10). TrE 1110 forwards the binding authentication for HPM 1120 to HPM 1120 over the secure channel (11).

When the TrE is tightly integrated to the H(e)NB (e.g. TrE is a chip on the H(e)NB, etc), there may be no need to explicitly bind the TrE to the H(e)NB, since the TrE will be bound to the H(e)NB_EI physically. In this case, a 2-way binding can be obtained between the H(e)NB and the HPM. Effectively, in this case, the identity of the H(e)NB can be authenticated by an authentication of the TrE's identity, i.e., H(e)NB_EI is one and the same as the TrE_ID.

Figure 12:
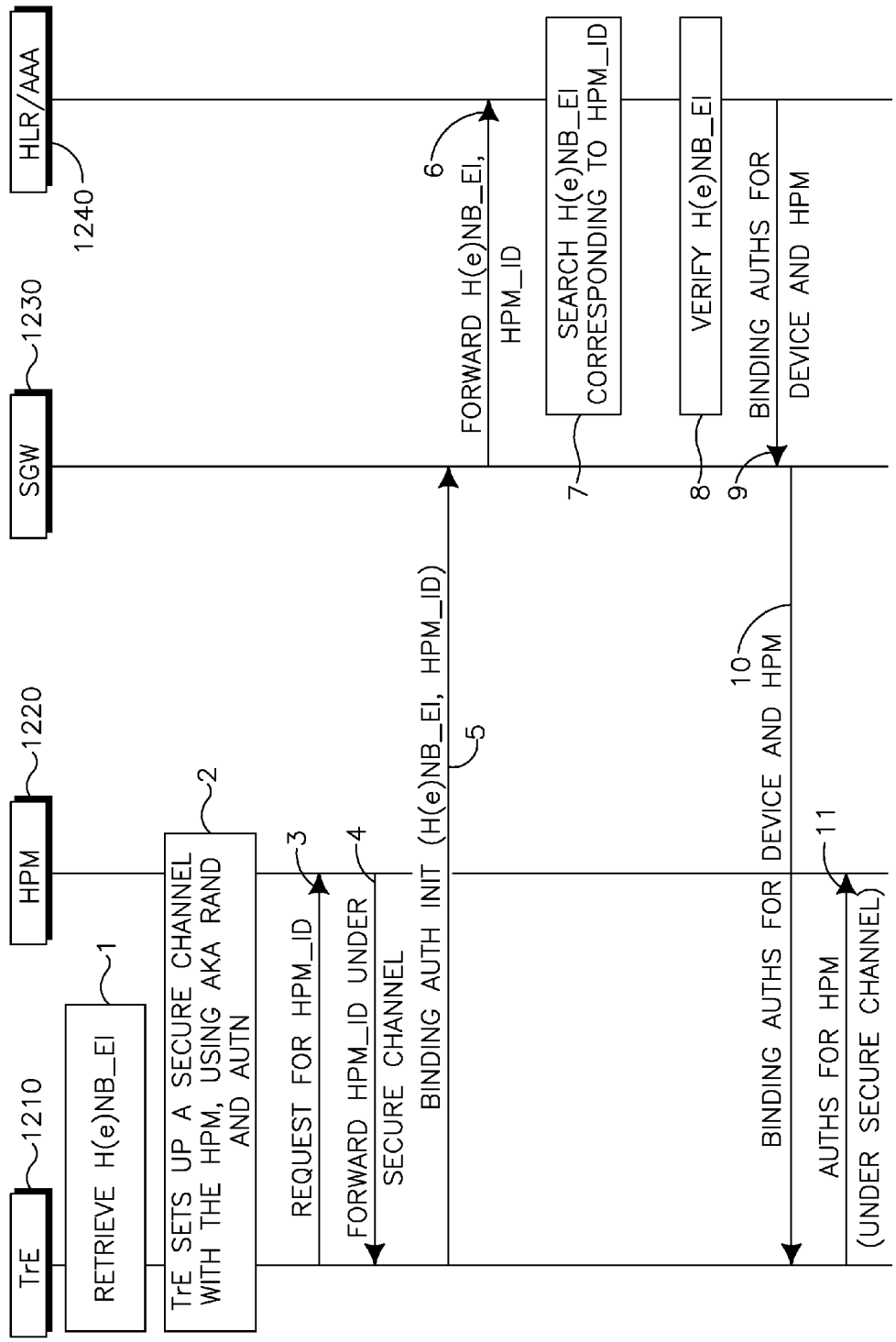
FIG. 12 is an example flow diagram for two way binding.

FIG. 12 shows an embodiment of a two-way binding authentication. Initially, TrE 1210 retrieves the H(e)NB_EI that it securely holds (1). Note that H(e)NB_EI is the same as the TrE_ID. TrE 1210 sets up a secure channel with HPM 1220 using AKA RAND and AUTN (2). TrE 1210 next requests (3) and receives the HPM_ID from the HPM under the secure channel (4). TrE 1210 then forwards H(e)NB_EI, and HPM_ID to SGW 1230 (5).

SGW 1230 forwards H(e)NB_EI and HPM_ID to HLR/AAA 1240 (6). HLR part of HLR/AAA 1240 then searches for the H(e)NB_EI corresponding to the HPM_ID (7). The AAA part of HLR/AAA 1240 then verifies the H(e)NB_EI it received from SGW 1230 by comparing it with the H(e)NB_EI in its record that corresponded to the HPM_ID (8). The HLR part of HLR/AAA 1240 then sends to SGW 1230 the binding authentication for TrE 1210 (which is equivalent to authenticating the H(e)NB in this case) and HPM 1220 (9).

SGW 1220 next forwards the binding authentication for TrE 1210 (and equivalently for H(e)NB) and HPM 1220 to TrE 1210 of the H(e)NB (10). TrE 1210 forwards the binding authentication for HPM 1220 to HPM 1220 protected under the secure channel (11).

Figure 13:
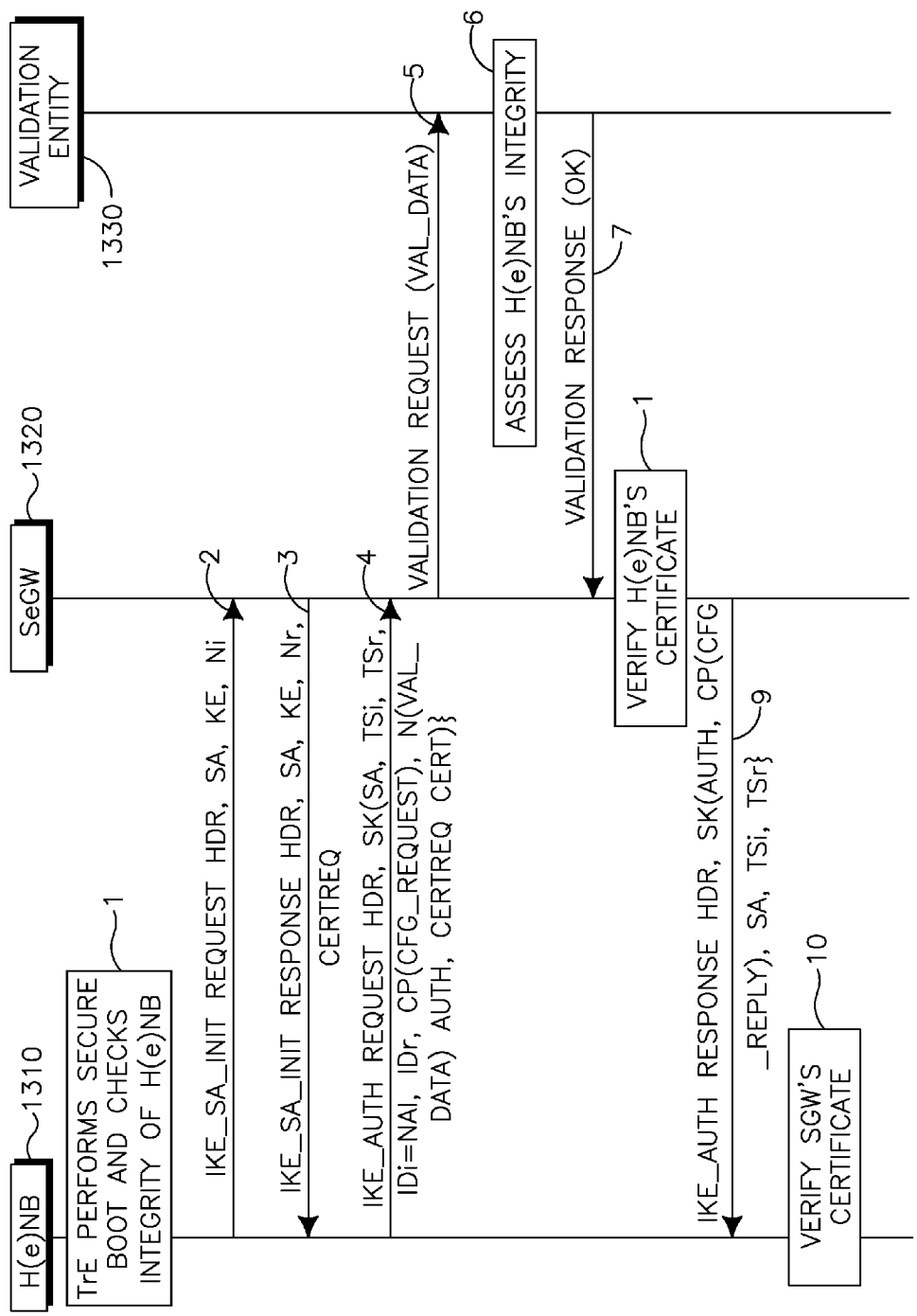
FIG. 13 is an example flow diagram for combining device authentication and device integrity checking and device validation using IKEv2 protocol.

FIG. 13 shows an embodiment of a method where authentication and device validation are performed in a combined way. In this embodiment, IKEv2 protocol is used to combine device validation and device authentication. However other protocols that are used for authentication of devices or equipment include, but are not limited to, transport layer security (TLS), Hypertext Transfer Protocol Secure (HTTPS), OMA DM, TR069, etc.

Initially, H(e)NB's 1310 TrE performs a secure boot and checks the integrity of the H(e)NB 1310 (1). Then the H(e)NB 1310 initiates a IKEv2 session and sends a IKE_SA_INIT request message to the SGW 1320 where the message includes HDR, SA (security association), KE (Diffie-Hellman key element), and Ni (initiator nonce) (2). Upon receipt of this signal, SGW 1320 sends to the H(e)NB 1310 a IKE_SA_INIT response including HDR, SA, KE, Nr (respondent nonce), and CERTREQ (which is a request for device certificate) (3). Using the KEs at both ends, the H(e)NB 1310 and the SGW 1320 now each generates cryptographic keys to use for confidentiality and integrity protection of further message exchanges during the IKEv2 session.

The H(e)NB 1310 then sends a IKE_AUTH request message to the SGW 1320 where the message is protected for confidentiality and integrity by the Diffie-Hellman generated key (4). The content of the message includes HDR (header), which is not protected, and a protected part that includes the SA (security association), TSi (traffic selector of the initiator), TSr (traffic selector of the respondent), IDi (which is the ID, in NAI format, of the H(e)NB 1310), IDr (which is the ID of the SGW 1320), and CP (configuration parameters), Notify message that includes the data (called VAL_DATA here) indicating the process or outcome of the device integrity check performed by the H(e)NB 1310, the AUTH parameter the H(e)NB 1310's TrE computes as evidence that H(e)NB holds a valid device certificate, CERTREQ (which is a request for server-side certificate to be used for server-side authentication), and CERT (which is the device certificate that the SGW 1320 uses to authenticate the H(e)NB 1310).

Upon receipt of this message the SGW 1320 then extracts the device integrity check data (VAL_DATA) and sends it to a Validation Entity 1330 (5), which then assesses, using the forwarded VAL_DATA and any other reference information it may have, the trustworthiness or integrity of the H(e)NB 1310 (6), and then sends a validation response signal back to the SGW 1320 in case it assesses that the H(e)NB 1310 is correct from a device integrity point of view (7). Upon receipt of a positive validation response from the Validation Entity 1330, the SGW 1320 can then verify the H(e)NB's certificate (CERT) that it had received from the H(e)NB 1310 and check if it can authenticate the H(e)NB 1310 (8). If positive, the SGW 1320 can then send an IKE_AUTH response message which includes HDR (unprotected header) and protected part that includes the AUTH (for its own server-side authentication evidence), CP, SA, TSi, and TSi (9).

Alternatively, the steps to check the VAL_DATA between the SGW 1320 and the Validation Entity 1330 could take place after the SGW 1320 verifies the H(e)NB's certificate and authenticates the H(e)NB 1310 and sends the IKE_AUTH response message to the H(e)NB 1310.

The H(e)NB 1310, upon receipt of the IKE_AUTH response message, can then verify using the server CERT it received from the SGW 1320 (10).

The TrE may also assure security for using location information for H(e)NB authentication. First, the TrE of the H(e)NB may perform several functions to protect the security of the location information handling, including retrieval, storage, protection, and use in authentication. More specifically, any location information that is certified by any of the location methods described herein may be stored and handled in a trusted way. This means that such information may be stored and handled under the protection of the H(e)NB TrE. More specifically, the H(e)NB TrE may receive cryptographically protected location information from the sources of such information. It may also securely decipher such encrypted location information. Further, it may securely protect location information while in storage either in the TrE or externally with cryptographic protection using keys stored securely inside the TrE. The TrE may extract location information held inside the TrE or from external memory. It may protect location information by encryption before forwarding it to the SGW. And it may forward encrypted location information to the SGW for inclusion in the device authentication protocol.

Also, during either a location registration (or certification) process or a location authentication process, the H(e)NB TrE may protect, using cryptographic means, the integrity and/or the confidentiality of the location information the H(e)NB sends to the HLR while such information is in transit to the HLR. It may also provide secure cryptographic handling, including decryption and integrity checking, of any cryptographically protected location-related information the H(e)NB receives from the HLR. Any cryptographic keys that are used for these purposes on the H(e)NB may be protected by the H(e)NB TrE. Furthermore, H(e)NB TrE may also assure the authenticity and optionally the integrity of the functionality within the H(e)NB that relate to obtaining, storing, and handling sensitive location information.

Embodiments for location registration and location authentication based on the particular location information chosen are disclosed herein.

A H(e)NB may be connected to the IP network via some access device (e.g. DSL modem, cable modem, home router, etc.) and have an IP address assigned by a broadband access provider. By binding the physical ports of the broadband access network with the geographical information, the operator can locate the H(e)NB.

The assigned IP address, user identification and location information related to the IP address are stored in the network database after initial registration of H(e)NB location information. The core network (CN) can query the network database to obtain the IP address, the port number(s) bound with the IP address, and/or the address information (even the longitude and latitude values). The location locking mechanism consists of 1) the registration of H(e)NB location information; and 2) the authentication of H(e)NB location.

Location registration occurs when the H(e)NB powers on for the first time and connects to the core network through the IP backhaul. Initially, H(e)NB sends a request message to HLR that carries its IP address in this message. HLR then sends a location information query message to the network database that carries the received IP address. Based on the IP address, the database queries the table to obtain the access line location information of the above H(e)NB, such as the port numbers bound with the IP addresses, and even the longitude and latitude (if available). The HLR then determines the location of the H(e)NB based on the obtained information. HLR then registers the location of this H(e)NB. The HLR then replies in a response message to H(e)NB. After location registration, HLR can store location as an attribute of the H(e)NB profile, treating it as the location judgment criterion.

Location Authentication occurs every time the H(e)NB makes requests to the access network. Therefore, there is no need for registration. Initially, H(e)NB sends an access request message to the HLR that carries its IP address. The H(e)NB's TrE may protect the integrity and/or the confidentiality of such IP address information while it is in transit, using cryptographic keys protected that is by itself All cryptographic processing may take place within the TrE.

Upon receiving the H(e)NB's IP address, the HLR first checks the integrity of the IP address, and if it checks, queries the database again to obtain the location information. The HLR then authenticates whether the access line location information it obtained from the H(e)NB corresponds to the location information it retrieved from its database for the same H(e)NB. If it is the same, the HLR keeps the existing location for the H(e)NB in its database.

The HLR replies to the H(e)NB with the location authentication result in a response message. If the access line location information newly obtained from the H(e)NB does not match the one in the H(e)NB profile, the HLR returns a H(e)NB Access Response message to refuse the H(e)NB access and indicates "invalid location" as the cause value. If the access line location information match, the HLR returns an H(e)NB Access Response to allow the H(e)NB access.

Although H(e)NB's location can be authenticated using location authentication, IP address spoofing attacks may be possible. For example, a proxy server may take on the same IP address as a legitimately registered H(e)NB when the H(e)NB is relocated to another area. Such a proxy server may then be able to disguise itself as the legitimate H(e)NB as far as location is concerned.

In any of the above steps where the H(e)NB receives information or messages from the HLR, and if any such information is cryptographically protected, decryption and integrity checking of such information or messages may be performed within the H(e)NB TrE and by using keys that are protected by the H(e)NB TrE.

An embodiment based on neighboring macro-cells is now disclosed. To be located on the basis of macro cell information, a H(e)NB must be installed in the coverage of a macro cell, have a 3G or 2G receiver, and is able to switch to the receiver working state to scan the neighboring macro 3G or 2G cells of the H(e)NB. The location locking mechanism based on macro-cells is similar to that above but the location information is presented in the form of information about macro-cells, such as Public Land Mobile Network (PLMN) ID, Location Area Information (LAI) or Cell ID.

The initial step is to register H(e)NB location information. After a H(e)NB is powered on, it scans the neighboring macro cells. Then the H(e)NB sends a H(e)NB Request message to the HLR. The message carries the information such as location area and cell ID of the neighboring macro cells. The H(e)NB's TrE may protect the integrity and/or the confidentiality of such location area and cell ID information using keys protected by itself. All cryptographic processing may take place within the TrE. The HLR registers the cell ID of the neighboring macro cells as an attribute of the H(e)NB profile, and sends a H(e)NB Response message to the H(e)NB.

The next step is to authenticate the H(e)NB location. The H(e)NB sends an Access Request message to the HLR. The message carries information such as location area and cell ID of the neighboring macro cells. The H(e)NB's TrE may cryptographically protect the integrity and/or the confidentiality of such location area and cell ID information while they are in transit to the HLR using keys that are protected by itself. All cryptographic processing may take place within the TrE. HLR compares the information of neighboring macro cells with the saved H(e)NB profile to determine whether to allow the H(e)NB to connect to the network through the bound cell or location area. If the information of neighboring macro cells does not match the H(e)NB profile, the HLR returns a H(e)NB Access Response message to refuse the H(e)NB access and indicates "invalid location" as the cause value. If the information of neighboring macro cells matches the H(e)NB profile, the HLR returns a H(e)NB Access Response to allow the H(e)NB access.

In any of the above procedures where the H(e)NB receives information or messages from the HLR, and if any such information is cryptographically protected, decryption and integrity checking of such information or messages may be performed within the H(e)NB TrE, and by using keys that are protected by the H(e)NB TrE.

Macro cells have large-area coverage. Therefore, simply using the cell information may not meet accuracy requirements for certain use cases. Using a combination of the IP address and the macro cell information could improve the accuracy.

An embodiment based on a combination of IP address and neighboring macro-cells is disclosed. The initial step is H(e)NB location information registration. H(e)NB sends the request message to HLR that carries its IP address and neighboring cell ID in this message. The H(e)NB's TrE may cryptographically protect the integrity and/or the confidentiality of the IP address and cell ID information while they are in transit to the HLR, using cryptographic keys that are protected by itself. All cryptographic processing may take place within the TrE.

HLR then sends a Location Information Query message to a fixed network database that carries the received IP address. Based on the IP address, the HLR queries the database in order to obtain the access line location information bound with the H(e)NB IP address. According to the access line location information and neighboring macro cell ID, HLR determines the home area of the H(e)NB. HLR stores the access line location information of this H(e)NB together with the received cell ID as attributes of the H(e)NB.

The next step is to authenticate the H(e)NB location. HLR receives the Access request message from H(e)NB, which carries its IP address and the cell ID of the surrounding macro cell. According to the new IP address, HLR queries the database again to obtain the access line location information. HLR then judges whether the new obtained access line location information is the same with the stored one, and additionally whether the received cell ID is the same with the stored ones. If they are both the same, the H(e)NB location is not changed. The HLR next replies to the H(e)NB the location authentication result in the access response message.

In any of the above procedures where the H(e)NB receives information or messages from the HLR, and if any such information is cryptographically protected, decryption and integrity checking of such information or messages may be performed within the H(e)NB TrE, and by using keys that are protected by the H(e)NB TrE.

Note that even if H(e)NB moves to another unregistered address, H(e)NB may still be located within the same macro cell. This arrangement may improve the security of the location authentication scheme.

An embodiment based on global positioning system (GPS) is disclosed. When H(e)NB has built in GPS capability, its location information may be obtained via the GPS within the H(e)NB and subsequently can be sent from the H(e)NB to the CN during access request. GPS may not work very well, however, in some indoor environments.

The H(e)NB's TrE may cryptographically protect the integrity and/or the confidentiality of any GPS location information it sends to the HLR, using keys that are protected by itself. The H(e)NB's TrE may securely handle all cryptographic handling of any cryptographically protected information or messages the H(e)NB receives from the HLR, using keys protected within the TrE.

The security of the GPS-based location certification method may also be protected by using tamper-resistant or tamper-evident GPS devices, especially if the GPS function is isolated in a separate chip. A security-hardened GPS chip, for example, may be used.

In another embodiment, the TrE of the H(e)NB may also securely store a 'last known good location' at periodic intervals and/or upon occurrence of certain pre-defined events. Such 'last known good location' would be location information that would be certified by the location server of the network operator. Upon a new boot of the H(e)NB, the TrE of the H(e)NB could look up the stored 'last known good location' and compare it with the location that it newly acquires from its location-identifying methods. The TrE could then use the outcome of such a comparison to autonomously determine if there is likelihood of a change in the location of the H(e)NB. The TrE could also report such an outcome to the location server on the network.

Discussed now are H(e)NB location policy options and configuration. Which of the approaches to use depends on a number of factors, such as the security level and accuracy level the operator demands, H(e)NB capability, existing macro coverage. A policy may be applied to assist in determining the method to be used. It is suggested that the policy be pre-configured in the H(e)NB, and the H(e)NB automatically adapt to it. Any security policy for a location certification method may be administered from within the H(e)NB's TrE.

Using an IP address alone may not be secure enough. GPS may not work well in some indoor environments, and also may add cost to the H(e)NB. Considering the feasibility and secure requirement, location locking mechanism based on IP address and neighboring macro-cells may be considered. This method may be ranked first on the policy list. If there is no macro cell coverage, other methods can be used according to the order of preference in the policy. Since GPS adds to the cost and not all H(e)NBs may have GPS installed within them, GPS-based location methods may be placed lower in the preference order. As shown in Table 5, different combinations of scenarios and policies may exist as well as others not shown.

TABLE 5

| Scene/Scenario | Policy |
| --- | --- |
| Macro cell exist and high security requirement | IP address + Macro cell |
| No macro cell exist | IP address |
| Macro cell exit and low accuracy requirement | Macro cell |
| GPS installed in H(e)NB | GPS information + IP address |
| GPS installed in H(e)NB and Macro cell exists | GPS information + IP address + Macro cell |

Although features and elements are described above in particular combinations, each feature or element can be used alone without the other features and elements or in various combinations with or without other features and elements.

The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed:

1. A method for authenticating a home nodeB/home evolved node B (H(e)NB) with a network, comprising:
   securely storing H(e)NB location information in a Trusted Environment (TrE);
   securely sending the stored H(e)NB location information to the network via the TrE;
   securely storing a last known good location of the H(e)NB in the TrE;
   comparing the stored last known good location with a newly acquired location information using the TrE; and
   indicating the outcome of the comparison by the TrE to a location server on the network.

2. The method of claim 1, further comprising securely storing the last known good location of the H(e)NB in the TrE after at least one of the expiration of a periodic interval or the occurrence of a pre-defined event.

3. The method as in claim 1, wherein protocols for interacting between the H(e)NB, the TrE and the network include at least one of Internet Key Exchange (IKEv2), Transport Layer Security (TLS), Broadband Forum Technical Requirements (TR) 069, or Open Mobile Alliance (OMA) Device Management (DM).

4. The method of claim 1, further comprising:
   receiving cryptographically protected H(e)NB location information from a location information source; and
   securely deciphering the cryptographically protected H(e)NB location information to identify the H(e)NB location information.

5. The method of claim 1, wherein the stored H(e)NB location information is cryptographically protected using keys stored securely inside the TrE.

6. The method of claim 1, wherein the sent H(e)NB location information is cryptographically protected.

7. The method of claim 1, wherein the H(e)NB location information is sent to the network via the TrE in a location registration request message.

8. The method of claim 1, further comprising:
receiving a response from the network indicating the results of a decision of whether to grant the H(e)NB access to the network, wherein the decision is based on a comparison between the sent H(e)NB location information and a previous H(e)NB location information,
wherein the H(e)NB location information is sent to the network via the TrE in a location authentication request message.

9. The method of claim 1, wherein the H(e)NB location information comprises an IP address assigned to the H(e)NB.

10. The method of claim 1, further comprising:
scanning for information on macro cells neighboring the H(e)NB,
wherein the location information comprises information on macro cells neighboring the H(e)NB.

11. The method of claim 10, wherein the macro cells neighboring the H(e)NB comprise 2G or 3G cells, wherein the information on macro cells neighboring the H(e)NB comprises location area and cell ID.

12. The method of claim 10, wherein the H(e)NB location information further comprises an IP address assigned to the H(e)NB.

13. The method of claim 1, wherein the H(e)NB has GPS capabilities, wherein the H(e)NB location information comprises GPS location information obtained from the H(e)NB.

14. The method of claim 13, wherein the H(e)NB GPS capabilities comprise a separate security-hardened GPS chip.

15. The method of claim 1, wherein the H(e)NB location information is selected from one or more of:
an IP address assigned to the H(e)NB,
information on macro cells neighboring the H(e)NB, and
GPS location information associated with the H(e)NB;
wherein the H(e)NB location information is selected in accordance with a scenario and policy based pre-configured H(e)NB policy.

16. A H(e)NB, comprising:
a TrE; and
H(e)NB functional building blocks, at least one of the H(e)NB function building blocks:
securely storing H(e)NB location information in a Trusted Environment (TrE);
securely sending the stored H(e)NB location information to the network via the TrE;
securely storing a last known good location of the H(e)NB in the TrE;
comparing the stored last known good location with a newly acquired location information using the TrE; and
indicating the outcome of the comparison by the TrE to a location server on the network.

17. The H(e)NB of claim 16, further comprising the at least one of the H(e)NB function building blocks:
receiving a response from the network indicating the results of a decision of whether to grant the H(e)NB access to the network, wherein the decision is based on a comparison between the sent H(e)NB location information and a previous H(e)NB location information,
wherein the H(e)NB location information is sent to the network via the TrE in a location authentication request message.

18. The H(e)NB of claim 16, wherein the H(e)NB location information comprises an IP address assigned to the H(e)NB.

19. The H(e)NB of claim 16, further comprising the at least one of the H(e)NB function building blocks:
scanning for information on macro cells neighboring the H(e)NB,
wherein the location information comprises information on macro cells neighboring the H(e)NB.

20. The H(e)NB of claim 19, wherein the macro cells neighboring the H(e)NB comprise 2G or 3G cells, wherein the information on macro cells neighboring the H(e)NB comprises location area and cell ID.

21. The H(e)NB of claim 16, wherein the H(e)NB has GPS capabilities, wherein the H(e)NB location information comprises GPS location information obtained from the H(e)NB.

22. The H(e)NB of claim 16, wherein the H(e)NB location information is selected from one or more of:
an IP address assigned to the H(e)NB,
information on macro cells neighboring the H(e)NB, and
GPS location information associated with the H(e)NB;
wherein the H(e)NB location information is selected in accordance with a scenario and policy based pre-configured H(e)NB policy.

* * * * *